(12) United States Patent
Bridges et al.

(10) Patent No.: US 8,677,643 B2
(45) Date of Patent: Mar. 25, 2014

(54) COORDINATE MEASUREMENT MACHINES WITH REMOVABLE ACCESSORIES

(75) Inventors: Robert E. Bridges, Kennett Square, PA (US); Clark H. Briggs, DeLand, FL (US); John M. Hoffer, Jr., Bel Air, MD (US)

(73) Assignee: Faro Technologies, Inc., Lake Mary, FL (US)

( * ) Notice: Subject to any disclaimer, the term of this patent is extended or adjusted under 35 U.S.C. 154(b) by 17 days.

(21) Appl. No.: 13/524,028

(22) Filed: Jun. 15, 2012

(65) Prior Publication Data

US 2013/0097882 A1 Apr. 25, 2013
US 2013/0212889 A9 Aug. 22, 2013

Related U.S. Application Data

(63) Continuation-in-part of application No. 13/006,507, filed on Jan. 14, 2011, now Pat. No. 8,533,967, and a continuation-in-part of application No. 13/493,639, filed on Jun. 11, 2012, which is a continuation-in-part of application No. 13/006,507.

(60) Provisional application No. 61/296,555, filed on Jan. 20, 2010, provisional application No. 61/355,279, filed on Jun. 16, 2010, provisional application No. 61/351,347, filed on Jun. 4, 2010.

(51) Int. Cl.
*G01B 11/00* (2006.01)

(52) U.S. Cl.
USPC .......................................................... 33/503

(58) Field of Classification Search
USPC ........... 33/503, 504, 502, 556, 558, 559, 1 M, 33/1 PT, 227, 293
See application file for complete search history.

(56) References Cited

U.S. PATENT DOCUMENTS

| 1,535,312 A | 4/1925 | Hosking |
| 1,918,813 A | 7/1933 | Kinzy |

(Continued)

FOREIGN PATENT DOCUMENTS

| CN | 2236119 | 9/1996 |
| CN | 2508896 | 9/2002 |

(Continued)

OTHER PUBLICATIONS

Romer "Romer Measuring Arms Portable CMMs for R&D and shop floor" (Mar. 2009) Hexagon Metrology (16 pages).

(Continued)

*Primary Examiner* — Yaritza Guadalupe-McCall
(74) *Attorney, Agent, or Firm* — Cantor Colburn LLP

(57) ABSTRACT

A portable articulated arm coordinate measuring machine for measuring the coordinates of an object in space is provided. The AACMM includes a base and an arm portion having an opposed first and second ends. The arm portion including a plurality of connected arm segments that each includes at least one position transducer for producing a position signal. An electronic circuit is provided that receives the position signal from the at least one position transducer and provides data corresponding to a position of the measurement device. A noncontact three-dimensional measuring device is coupled to the first end, the device having an electromagnetic radiation transmitter and is configured to determine a distance to an object based at least in part on the speed of light in air. A processor is configured to determine the three-dimensional coordinates of a point on the object in response to receiving the position signals and the distance to the object.

26 Claims, 18 Drawing Sheets

(56) References Cited

U.S. PATENT DOCUMENTS

| | | |
|---|---|---|
| 2,316,573 A | 4/1943 | Egy |
| 2,333,243 A | 11/1943 | Glab |
| 2,702,683 A | 2/1955 | Green et al. |
| 2,748,926 A | 6/1956 | Leahy |
| 2,924,495 A | 2/1960 | Haines |
| 2,966,257 A | 12/1960 | Littlejohn |
| 2,983,367 A | 5/1961 | Paramater et al. |
| 3,066,790 A | 12/1962 | Armbruster |
| 3,458,167 A | 7/1969 | Cooley, Jr. |
| 4,138,045 A | 2/1979 | Baker |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A | 6/1991 | Potter |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,455,993 A | 10/1995 | Link et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,887,122 A | 3/1999 | Terawaki et al. |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,125,337 A | 9/2000 | Rosenberg et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,366,831 B1 | 4/2002 | Raab |
| 6,408,252 B1 | 6/2002 | De Smet |
| 6,418,774 B1 | 7/2002 | Brogaardh et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B1 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,256,899 B1 | 8/2007 | Faul et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |

(56) References Cited

U.S. PATENT DOCUMENTS

| | | |
|---|---|---|
| 7,383,638 B2 | 6/2008 | Granger |
| 7,388,654 B2 | 6/2008 | Raab et al. |
| 7,389,870 B2 | 6/2008 | Slappay |
| 7,395,606 B2 * | 7/2008 | Crampton ............... 33/503 |
| 7,430,068 B2 | 9/2008 | Becker et al. |
| 7,441,341 B2 * | 10/2008 | Eaton ............... 33/503 |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 * | 8/2009 | Eaton ............... 33/503 |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| D607,350 S | 1/2010 | Cooduvalli et al. |
| 7,656,751 B2 | 2/2010 | Rischar et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 8,352,212 B2 * | 1/2013 | Fetter et al. ............... 33/503 |
| 8,533,967 B2 * | 9/2013 | Bailey et al. ............... 33/503 |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0145703 A1 | 7/2006 | Steinbichler et al. |
| 2006/0169050 A1 | 8/2006 | Kobayashi et al. |
| 2006/0169608 A1 | 8/2006 | Carnevali |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 * | 7/2007 | Eaton ............... 33/502 |
| 2007/0163136 A1 * | 7/2007 | Eaton ............... 33/505 |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0247615 A1 | 10/2007 | Bridges |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |

(56) References Cited

U.S. PATENT DOCUMENTS

| | | |
|---|---|---|
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0148013 A1 | 6/2010 | Bhotika et al. |
| 2010/0207938 A1 | 8/2010 | Yau et al. |
| 2010/0208062 A1 | 8/2010 | Pettersson |
| 2010/0245851 A1 | 9/2010 | Teodorescu |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1* | 5/2011 | Fetter et al. .............. 33/503 |
| 2011/0164114 A1 | 7/2011 | Kobayashi et al. |
| 2011/0166824 A1 | 7/2011 | Haisty et al. |
| 2011/0169924 A1 | 7/2011 | Haisty et al. |
| 2011/0173827 A1* | 7/2011 | Bailey et al. .............. 33/503 |
| 2011/0173828 A1 | 7/2011 | York |
| 2011/0178755 A1 | 7/2011 | York |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260512 A1* | 10/2012 | Kretschmer et al. ........ 33/503 |
| 2012/0260611 A1 | 10/2012 | Jones |
| 2013/0025143 A1* | 1/2013 | Bailey et al. .............. 33/503 |
| 2013/0025144 A1* | 1/2013 | Briggs et al. .............. 33/503 |
| 2013/0027515 A1 | 1/2013 | Vinther et al. |
| 2013/0062243 A1 | 3/2013 | Chang et al. |
| 2013/0097882 A1* | 4/2013 | Bridges et al. ............. 33/503 |
| 2013/0125408 A1* | 5/2013 | Atwell et al. .............. 33/503 |
| 2013/0205606 A1* | 8/2013 | Briggs et al. .............. 33/503 |
| 2013/0212889 A9* | 8/2013 | Bridges et al. ............. 33/503 |

FOREIGN PATENT DOCUMENTS

| | | |
|---|---|---|
| CN | 2665668 | 12/2004 |
| CN | 1818537 | 8/2006 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 A1 | 11/1999 |
| DE | 10026357 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 | 1/2008 |
| DE | 202006020299 U1 | 5/2008 |
| DE | 102008039838 | 3/2010 |
| DE | 102005036929 B4 | 6/2010 |
| DE | 102008062763 B3 | 7/2010 |
| DE | 102009001894 | 9/2010 |
| EP | 0546784 A2 | 6/1993 |
| EP | 0730210 A1 | 9/1996 |
| EP | 0614517 | 3/1997 |
| EP | 1160539 | 12/2001 |
| EP | 1189124 | 3/2002 |
| EP | 0767357 B1 | 5/2002 |
| EP | 1361414 A1 | 11/2003 |
| EP | 1468791 A1 | 10/2004 |
| EP | 1669713 A1 | 6/2006 |
| EP | 1734425 A2 | 12/2006 |
| EP | 1429109 | 4/2007 |
| EP | 1764579 | 12/2007 |
| EP | 1878543 | 1/2008 |
| EP | 1967930 A2 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2177868 A2 | 4/2010 |
| EP | 2259013 | 12/2010 |
| EP | 2400261 | 12/2011 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 A | 2/2009 |
| GB | 2452033 A | 2/2009 |
| JP | 5581525 | 6/1955 |
| JP | 5827264 | 2/1983 |
| JP | 6313710 A | 11/1994 |
| JP | 7210586 A | 8/1995 |
| JP | 2003194526 | 7/2003 |
| JP | 2004257927 A | 9/2004 |
| JP | 2005517908 | 6/2005 |
| JP | 2006241833 | 9/2006 |
| JP | 2006301991 A | 11/2006 |
| JP | 2009524057 | 6/2009 |

(56) References Cited

FOREIGN PATENT DOCUMENTS

| | | |
|---|---|---|
| WO | 9208568 A1 | 5/1992 |
| WO | 9808050 | 2/1998 |
| WO | 9910706 A1 | 3/1999 |
| WO | 0014474 | 3/2000 |
| WO | 0033149 | 6/2000 |
| WO | 0034733 | 6/2000 |
| WO | 0177613 A1 | 10/2001 |
| WO | 02101323 A2 | 12/2002 |
| WO | 2004096502 A1 | 11/2004 |
| WO | 2005072917 A1 | 8/2005 |
| WO | 2005075875 | 8/2005 |
| WO | 2005100908 A1 | 10/2005 |
| WO | 2006051264 A1 | 5/2006 |
| WO | 2007002319 A1 | 1/2007 |
| WO | 2007028941 A1 | 3/2007 |
| WO | 2007125081 A1 | 11/2007 |
| WO | 2007144906 A1 | 12/2007 |
| WO | 2008027588 A2 | 3/2008 |
| WO | 2008047171 | 4/2008 |
| WO | 2008052348 A1 | 5/2008 |
| WO | 2008064276 A3 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011057130 A2 | 5/2011 |
| WO | 2012038446 A1 | 3/2012 |

OTHER PUBLICATIONS

Examination Report for German Application No. 11 2011 100 290.4 Report dated Jul. 16, 2013; based on PCT/US2011/021247.
JGENG "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
International Search Report for International Application No. PCT/US/2013/041826 filed May 20, 2013; mailed Jul. 29, 2013.
Written Opinion for International Application No. PCT/US/2013/041826 filed May 20, 2013; mailed Jul. 29, 2013.
Examination Report under Section 18(3); Report dated Oct. 31, 2012; Application No. GB1210309.9.
International Search Report of the International Searching Authority for Application No. PCT/US2013/022186; Date of Mailing: May 29, 2013.
Written Opinion of the International Searching Authority for Application No. PCT/US2013/022186; Date of Mailing: May 29, 2013.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P. Ben-Tzvi, et al "Extraction of 3D Images Using Pitch-Actuated 2D Laser Range Finder for Robotic Vision" (6 pages) BNSDOCID <XP 31840390A_1_>.
International Search Report for International Application No. PCT/US2013/040321 mailed Jul. 15, 2013.
YK Cho, et al. "Light-weight 3D LADAR System for Construction Robotic Operations" (pp. 237-244); 26th International Symposium on Automation and Robotics in Construction (ISARC 2009).
Written Opinion for International Application No. PCT/US2013/040321 mailed Jul. 15, 2013.

Examination Report under Section 18(3); Report dated Nov. 1, 2012; Application No. GB1210311.5.
Examination Report under Section 18(3); Report dated Nov. 6, 2012; Application No. GB1210306.5.
International Search Report of the International Searching Authority for Application No. PCT/US2012/032970; Date of Mailing Nov. 28, 2012.
International Search Report of the International Searching Authority for Application No. PCT/US2012/032972; Date of Mailing Nov. 28, 2012.
Written Opinion of the International Searching Authority for Application No. PCT/US2012/032970; Date of Mailing Nov. 28, 2012.
Written Opinion of the International Searching Authority for Application No. PCT/US2012/032972; Date of Mailing Nov. 28, 2012.
German Patent Application No. 11 2011 100 291.2 dated Dec. 20, 2012.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Examination Report for German Application No. 11 2011 100 193.2 Report dated Dec. 20, 2012; based on PCT/US2011/021249.
Faro Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.

(56) References Cited

OTHER PUBLICATIONS

International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
A. Hart; "Kinematic Coupling Interchangibility" Precision Engineering; vol. 28, No. 1; Jan. 1, 2004 pp. 1-15.
ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Anonymous : So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
GoMeasure3D—Your source for all things measurement, Baces 3D 100 Series Portable CMM from GoMeasure3D, [online], [retrieved Nov. 29, 2011], http://www.gomeasure3d.com/baces100.html.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Information on Electro-Optical Information Systems; EOIS 3D Mini-Moire C.M.M. Sensor for Non-Contact Measuring & Surface Mapping; Direct Dimensions, Jun. 1995.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
HYDROpro Navigation, Hydropgraphic Survey Software, Trimble, www.trimble.com, Copyright 1997-2003.
Written Opinion of the International Searching Authority for International Application No. PCT/US2011/021252 mailed Apr. 27, 2011.
Written Opinion of the International Searching Authority for International Application No. PCT/US2011/021250 mailed Apr. 18, 2011.
International Preliminary Report on Patentability for PCT/US2011/021274; Date of Completion Apr. 12, 2012.
International Preliminary Report on Patentability mailed May 9, 2012 for International Application Serial No. PCT/US2011/021253 International filing date Jan. 14, 2011. Date of Completion May 9, 2012.
International Search Report for International Application No. PCT/2011/020625 mailed Feb. 25, 2011.
International Search Report for International Application No. PCT/US2011/021270 mailed May 2, 2011.
International Search Report for International Application No. PCT/US2011/021274 mailed May 6, 2011.
International Search Report for International Application No. PCT/US2011/021276 mailed May 17, 2011.
International Search Report for International Application No. PCT/US2011/021246 mailed Apr. 12, 2011.
International Search Report for International Application No. PCT/US2011/021248 mailed Sep. 19, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021253 mailed Sep. 26, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report for International Application No. PCT/US2011/021273 mailed Apr. 20, 2011.
International Search Report for International Application No. PCT/US2011/021278 mailed May 25, 2011.
International Search Report for International Application No. PCT/US2011/021794 mailed Sep. 23, 2011.
International Search Report for International Application No. PCT/US2011/050787; Mailing date Mar. 11, 2011.
Jasperneite, et al., Enhancements to the Time Synchronization Standard IEEE-1588 for a System of Cascaded Bridges, IEEE, 2004.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
Romer Absolute Arm Maximum Performance Portable Measurement.
Romer Romer Absolute Arm Product Brochure: (2010); Hexagon Metrology; www.hexagonmetrology.com; Hexagon AB, 2010.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
Written Opinion of the International Searching Authority for International Application No. PCT/US2011/021246 mailed Apr. 12, 2011.
Written Opinion of the International Searching Authority for International Application No. PCT/US2011/021248 mailed Sep. 19, 2011.
Written Opinion of the International Searching Authority for International Application No. PCT/US2011/021249 mailed Apr. 21, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.

(56) References Cited

OTHER PUBLICATIONS

Written Opinion of the International Searching Authority for International Application No. PCT/US2011/021253 mailed Sep. 26, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021273 mailed Apr. 20, 2011.
Written Opinion of the International Searching Authority for International Application No. PCT/US2011/021278 mailed May 25 2011.
Written Opinion of the International Searching Authority for International Application No. PCT/US2011/021794 mailed Sep. 23, 2011.
Written Opinion of the International Searching Authority for International Application No. PCT/US2011/050787 mailed Mar. 11, 2011.
Written Opinion of the International Searching Authority for International Application No. PCT/US2011/021253 mailed Mar. 22, 2012.
Written Opinion of the International Searching Authority for International Application No. PCT/US2011/020625 mailed Feb. 25, 2011.
Written Opinion of the International Searching Authority for International Application No. PCT/US2011/021270 mailed May 2, 2011.
Written Opinion of the International Searching Authority for International Application No. PCT/US2011/021274 mailed May 6, 2011.
Written Opinion of the International Searching Authority for International Application No. PCT/US2011/021276 mailed May 17, 2011.
Laser Reverse Engineering with Microscribe, [online], [retrieved Nov. 29, 2011], http://www.youtube.com/watch?v=8VRz_2a EJ4E &feature=PlayList&p=F63ABF74F30DC81B&playnext=1 &playnext_from=PL&index=1.
International Search Report for International Application No. PCT/US2013/040309 mailed Jul. 15, 2013.
Written Opinion for International Application No. PCT/US2013/040309 mailed Jul. 15, 2013.

* cited by examiner

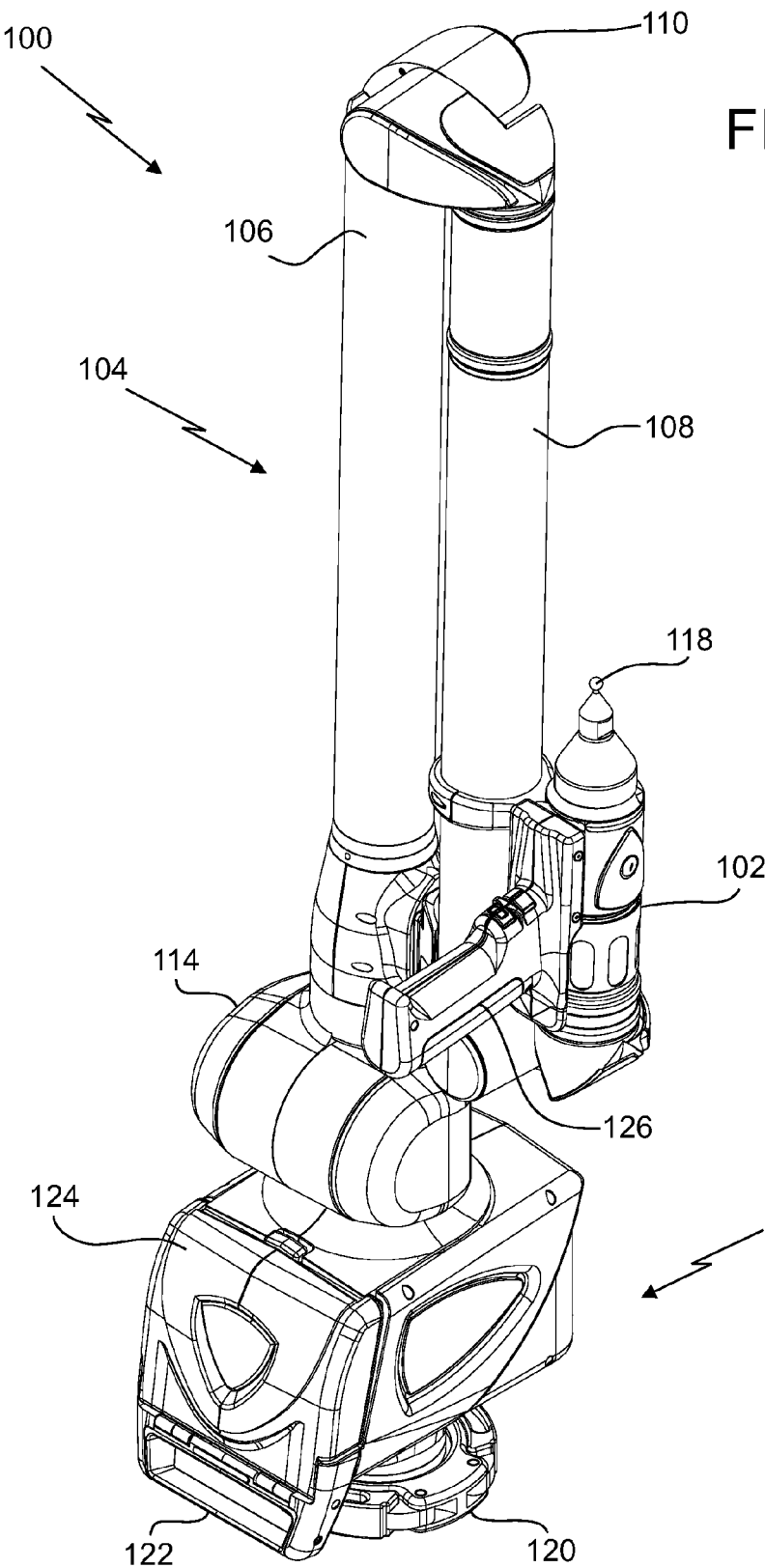

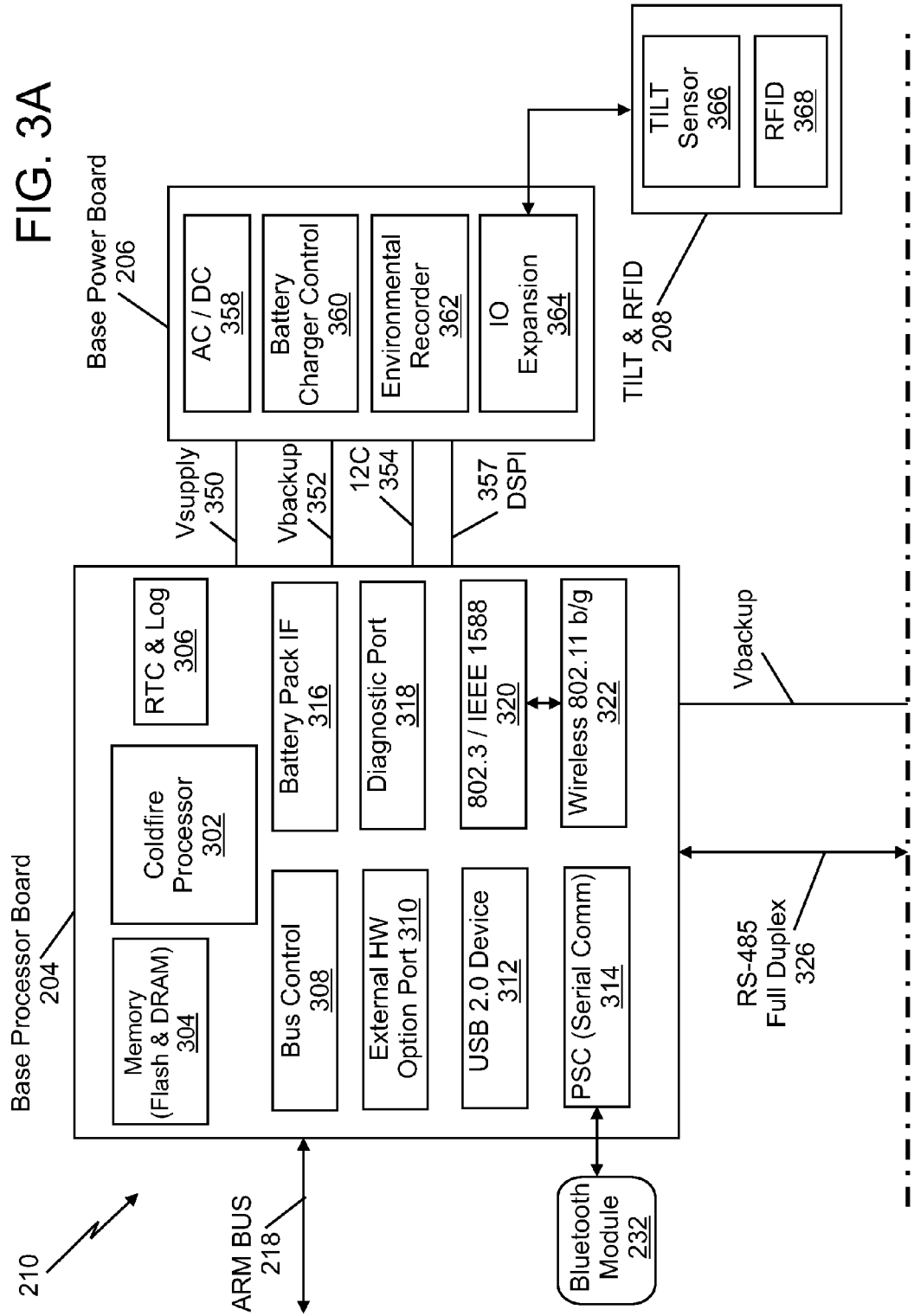

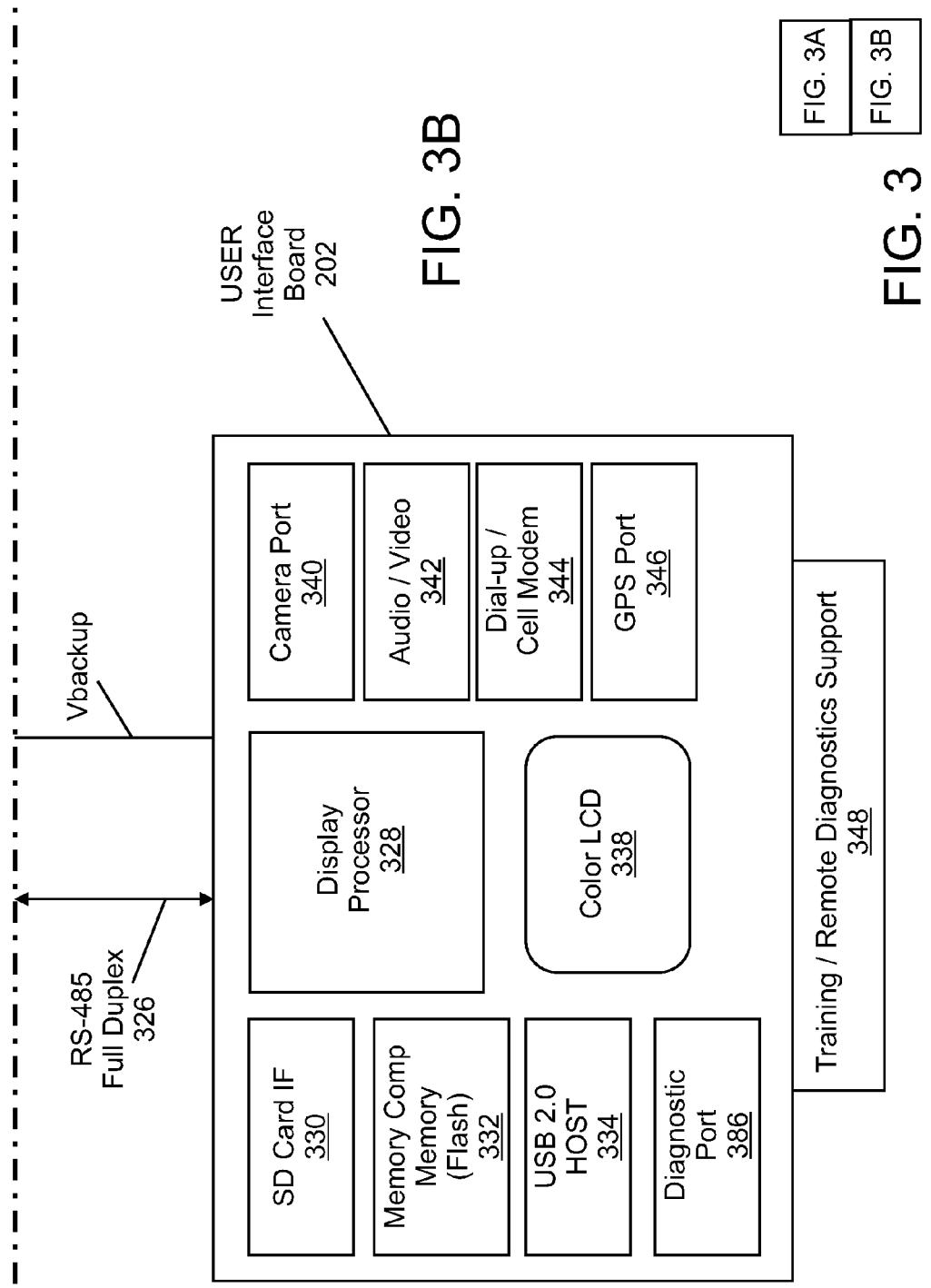

COORDINATE MEASUREMENT MACHINES WITH REMOVABLE ACCESSORIES

CROSS-REFERENCE TO RELATED APPLICATIONS

The present application is a continuation-in-part of U.S. patent application Ser. No. 13/006,507 filed Jan. 14, 2011 now U.S. Pat. No. 8,533,967, and claims the benefit of provisional application No. 61/296,555 filed Jan. 20, 2010, provisional application No. 61/355,279 filed Jun. 16, 2010, and provisional application No. 61/351,347 filed on Jun. 4, 2010, the contents of which are hereby incorporated by reference in their entirety. The present application is further a continuation-in-part of U.S. patent application Ser. No. 13/493,639, filed on Jun. 11, 2012. U.S. patent application Ser. No. 13/493,639 is a continuation-in-part application of U.S. patent application Ser. No. 13/006,507 filed on Jan. 14, 2011. U.S. patent application Ser. No. 13/006,507 claims the benefit of Provisional Application Ser. No. 61/296,555 filed on Jan. 20, 2010, and Provisional Application Ser. No. 61/355,279 filed on Jun. 16, 2010, and Provisional Application Ser. No. 61/351,347 filed on Jun. 4, 2010.

BACKGROUND

The present disclosure relates to a coordinate measuring machine, and more particularly to a portable articulated arm coordinate measuring machine having a connector on a probe end of the coordinate measuring machine that allows accessory devices which use transit time of flight for non-contact three dimensional measurement to be connected to the coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Three-dimensional surfaces may be measured using non-contact techniques as well. One type of non-contact device, sometimes referred to as a laser line probe, emits a laser light either on a spot, or along a line. A imaging device, such as a charge-coupled device (CCD) for example, is positioned adjacent the laser to capture an image of the reflected light from the surface. The surface of the object being measured causes a diffuse reflection. The image on the sensor will change as the distance between the sensor and the surface changes. By knowing the relationship between the imaging sensor and the laser and the position of the laser image on the sensor, triangulation methods may be used to measure points on the surface.

While existing CMMs are suitable for their intended purposes, what is needed is a portable AACMM that has certain features of embodiments of the present invention.

SUMMARY OF THE INVENTION

In accordance with one embodiment of the invention, a portable articulated arm coordinate measuring machine (AACMM) for measuring the coordinates of an object in space is provided. The AACMM includes a base and a manually positionable arm portion having an opposed first end and second end. The arm portion being rotationally coupled to the base, the arm portion including a plurality of connected arm segments, each arm segment including at least one position transducer for producing a position signal. An electronic circuit is configured to receive the position signal from the at least one position transducer. A probe end is coupled to the first end. A noncontact three-dimensional measurement device is coupled to the probe end. The noncontact three-dimensional measurement device having an electromagnetic radiation transmitter, the noncontact three-dimensional measurement device configured to determine a distance to an object based at least in part on the speed of light in air. A processor is electrically coupled to the electronic circuit, the processor configured to determine the three-dimensional coordinates of a point on the object in response to receiving the position signals from the electronic circuit and in response to receiving the distance to the object from the noncontact three-dimensional measurement device.

In accordance with one embodiment of the invention, a method of operating a portable articulated arm coordinate measuring machine for measuring three-dimensional coordinates of an object in space is provided. The method includes the step of providing a manually positionable arm portion having an opposed first end and second end, the arm portion including a plurality of connected arm segments, each arm segment including at least one position transducer for producing a position signal. An electronic circuit receives the position signals from the transducers. A noncontact three-dimensional measurement device is provided having a controller electrically coupled to the electronic circuit, the three-dimensional measurement device having an electromagnetic radiation transmitter and a sensor. An electromagnetic radiation is transmitted from the three-dimensional measurement device onto the object. A reflected electromagnetic radiation is received with the sensor. A distance to the object is determined from the reflected electromagnetic radiation received by the sensor, wherein the distance is based at least in part on the speed of light in air and on a time for the electromagnetic radiation to travel from the electromagnetic radiation transmitter to the object and return to the sensor.

In accordance with another embodiment of the invention, another portable articulated arm coordinate measuring machine (AACMM) for measuring three-dimensional coordinates of an object in space is provided. The AACMM includes a base and a manually positionable arm portion having an opposed first end and second end. The arm portion being rotationally coupled to the base, the arm portion including a plurality of connected arm segments, each arm segment including at least one position transducer for producing a position signal. An electronic circuit is provided which receives the position signal from the at least one position transducer. A probe end is disposed between the measurement device and the first end, the probe end having an interface on one side. A noncontact three-dimensional measurement device is removably coupled to the interface, the noncontact three-dimensional measuring device having a light source and an optical receiver. The noncontact three-dimensional measuring device configured to determine a distance to a point on the object based at least in part on a speed of light in air and on a time for light from the light source to travel from the light source to the object and return to the optical receiver. A processor is electrically coupled to the electronic circuit, the processor configured to determine the three-dimensional coordinates of the point on the object based at least in part on the position signals received from the transducers and on the determined distance.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A and 1B, are perspective views of a portable articulated arm coordinate measuring machine (AACMM) having embodiments of various aspects of the present invention therewithin;

FIG. 3, including FIGS. 3A and 3B taken together, is a block diagram describing detailed features of the electronic data processing system of FIG. 2 in accordance with an embodiment;

DETAILED DESCRIPTION

Portable articulated arm coordinate measuring machines ("AACMM") are used in a variety of applications to obtain measurements of objects. Embodiments of the present invention provide advantages in allowing an operator to easily and quickly couple accessory devices to a probe end of the AACMM that use structured light to provide for the non-contact measurement of a three-dimensional object. Embodiments of the present invention provide further advantages in providing for communicating data representing a distance to an object measured by the accessory. Embodiments of the present invention provide still further advantages in providing power and data communications to a removable accessory without having external connections or wiring.

Figure 1A:
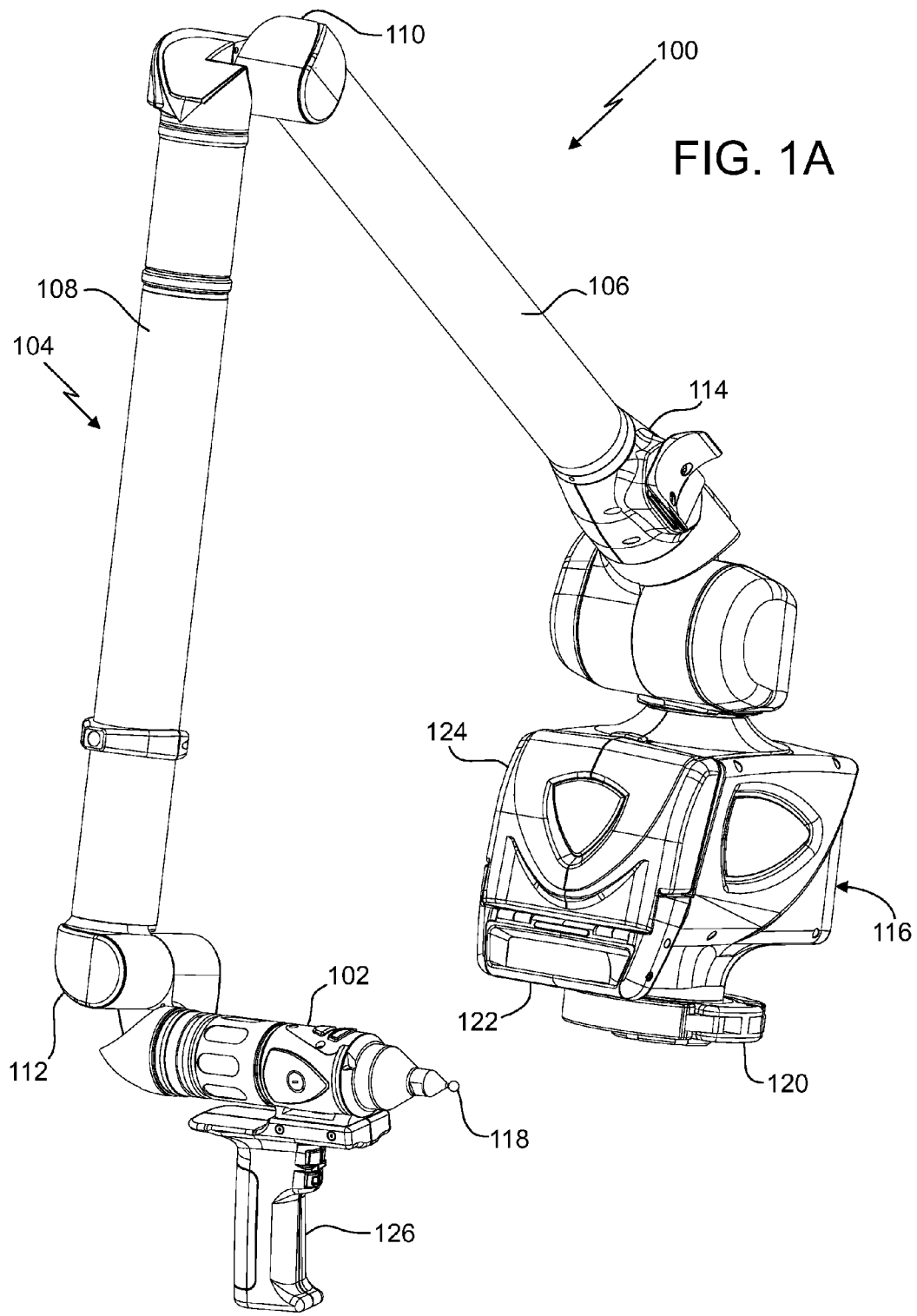
Figure 4:
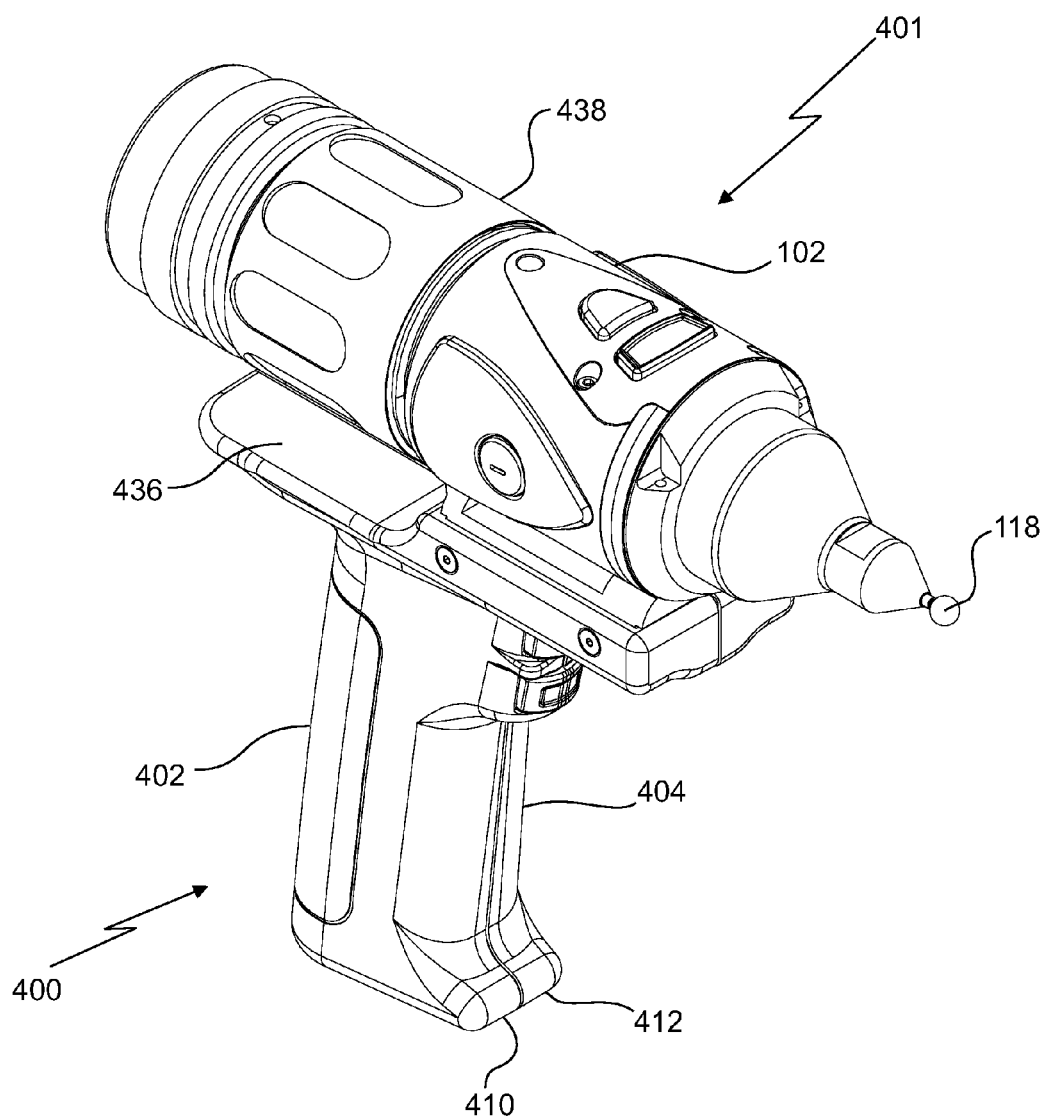
FIG. 4 is an isometric view of the probe end of the AACMM of FIG. 1.

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 (FIG. 4) that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of an axis of rotation for the AACMM 100 (e.g., a cartridge containing an encoder system that determines movement of the measurement device, for example a probe 118, in an axis of rotation for the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As will be discussed in more detail below, the handle 126 may be replaced with another device configured to provide non-contact distance measurement of an object, thereby providing advantages in allowing the operator to make both contact and non-contact measurements with the same AACMM 100. In exemplary embodiments, the probe 118 is a contacting measurement device and is removable. The probe 118 may have different tips 118 that physically contact the object to be measured, including, but not limited to: ball, touch-sensitive, curved and extension type probes. In other embodiments, the measurement is performed, for example, by a non-contacting device such as an interferometer or an absolute distance measurement (ADM) device. In an embodiment, the handle 126 is replaced with the coded structured light scanner device using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end 401.

In various embodiments, each grouping of bearing cartridges 110, 112, 114 allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a noncontact distance measurement device that can be mounted to the removable handle 126 on the AACMM 100). The electronics that support these peripheral hardware devices or features may be located in each of the bearing cartridge groupings 110, 112, 114 located within the portable AACMM 100.

Figure 2A:
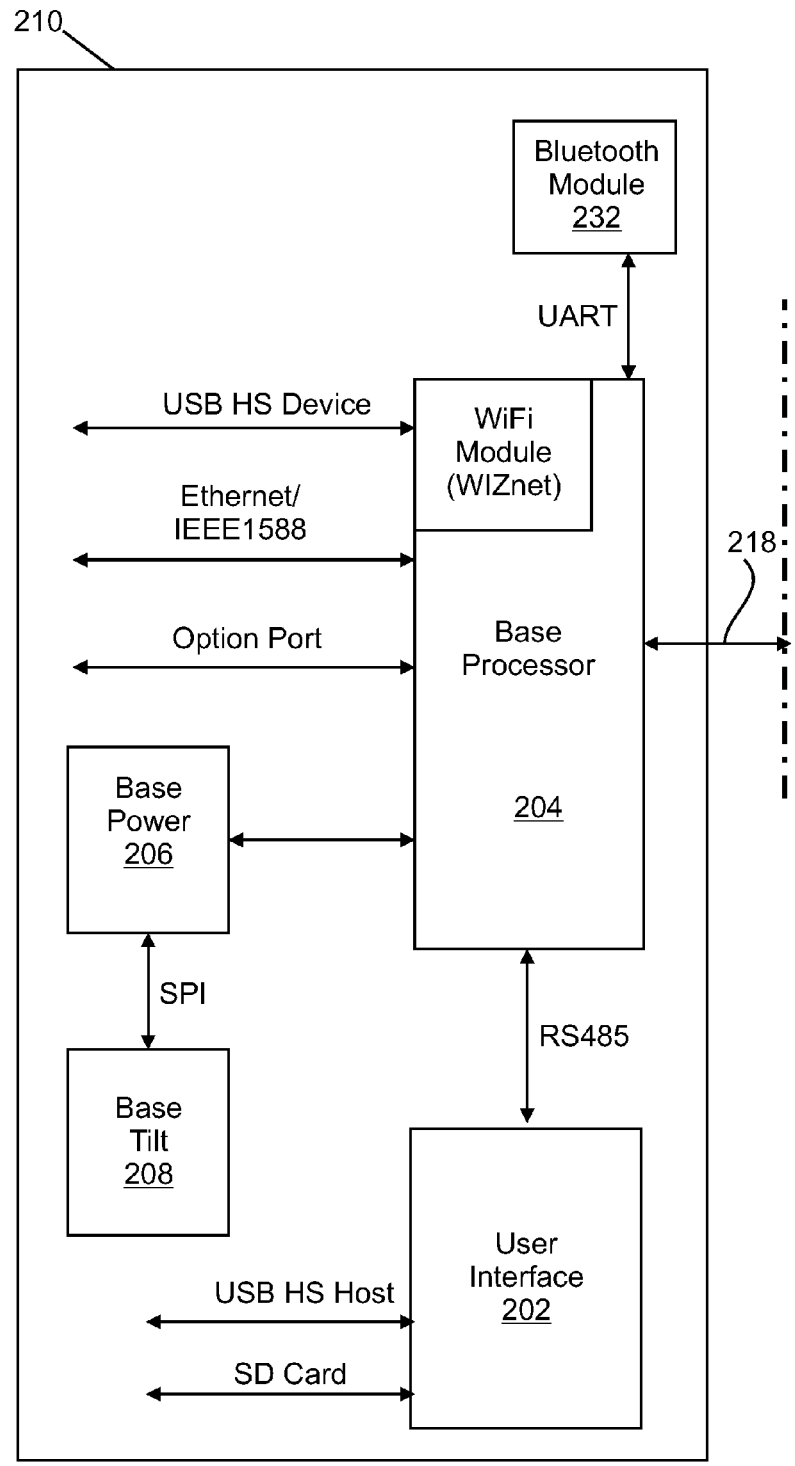
FIG. 2, including FIGS. 2A-2D taken together, is a block diagram of electronics utilized as part of the AACMM of FIG. 1 in accordance with an embodiment.
Figure 2B:
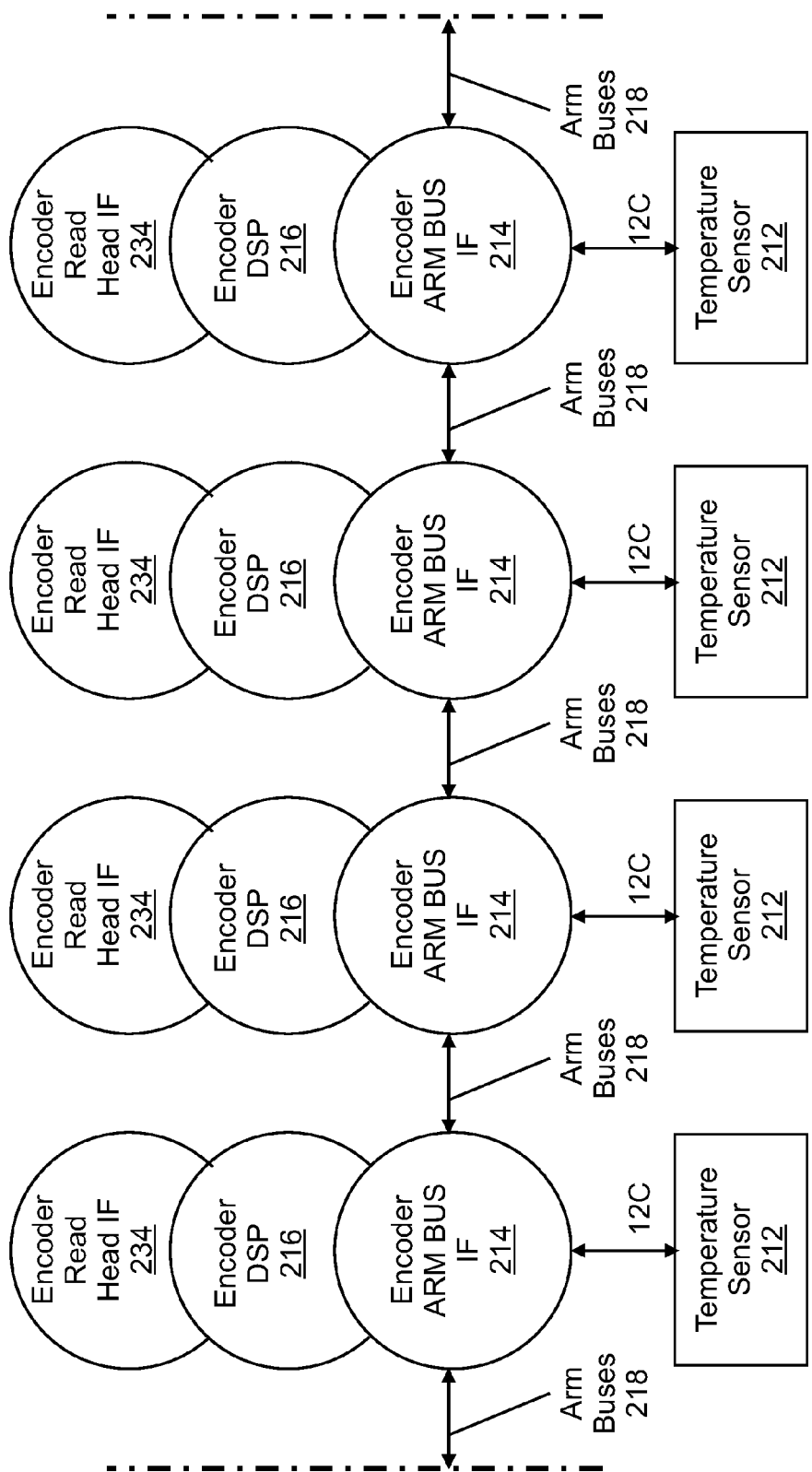
Figure 2C:
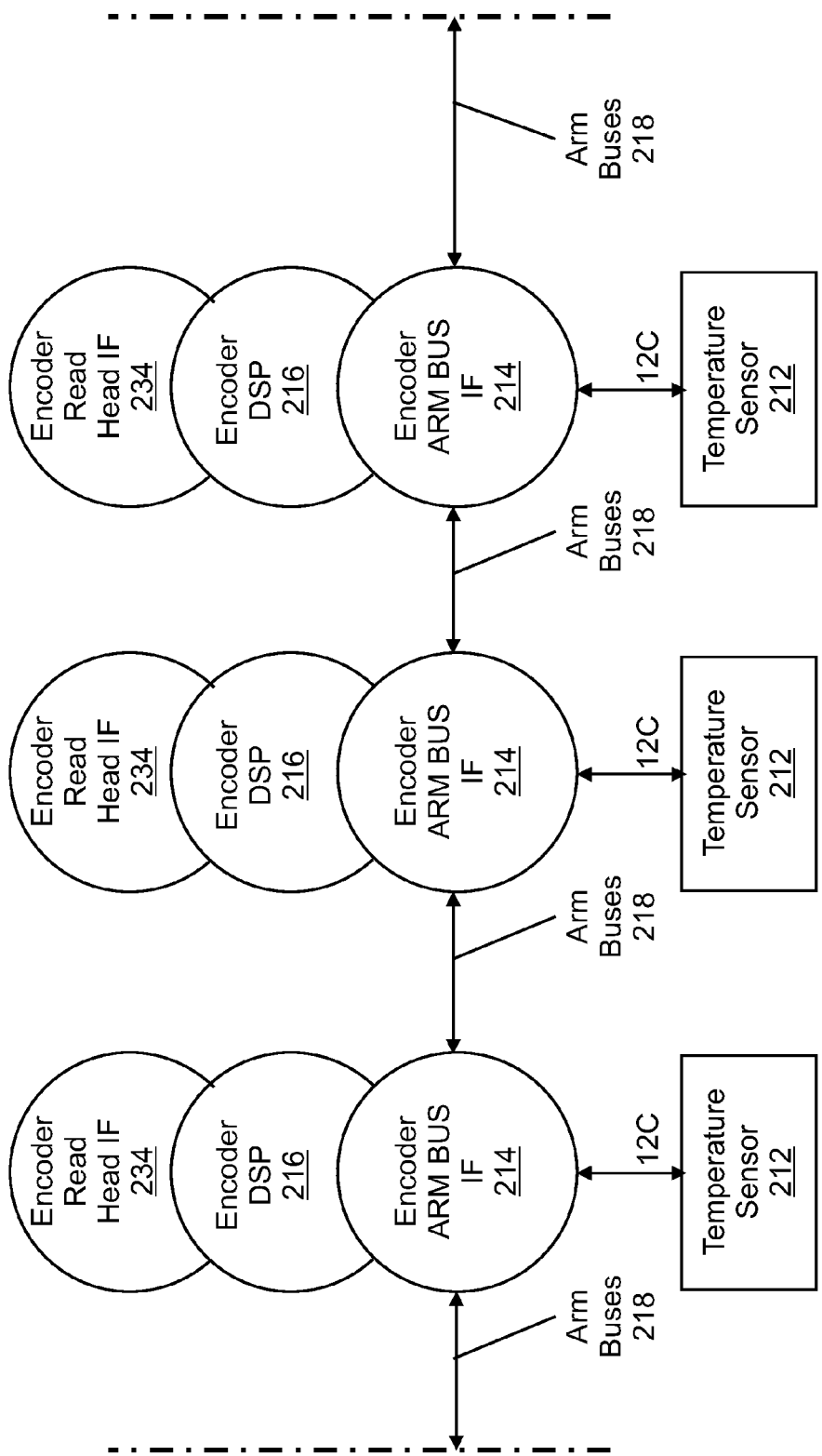
Figure 2D:
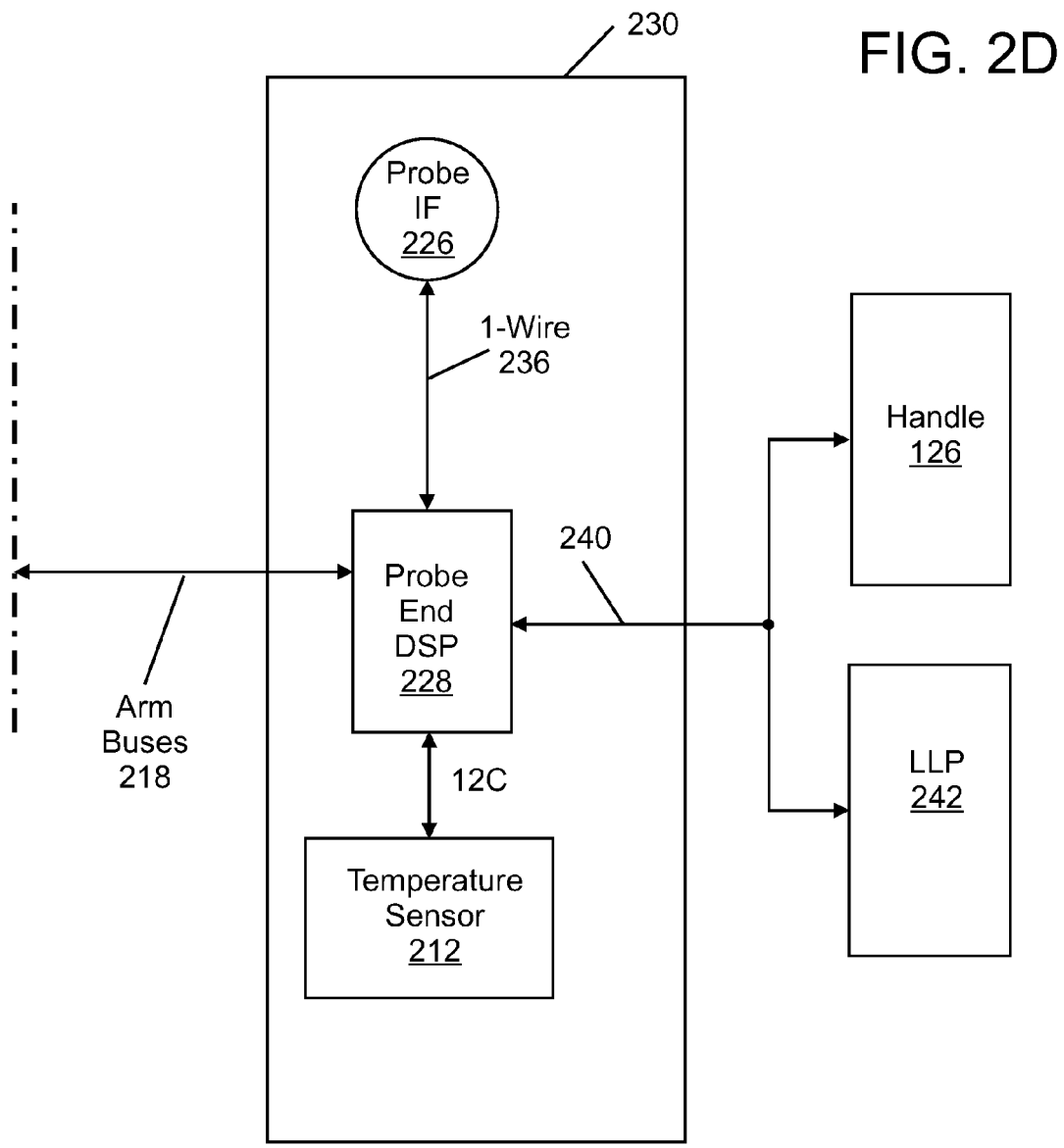
Figure 2:
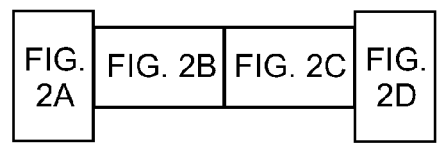

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2A, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the noncontact distance measurement device 242 via the quick-connect interface in an embodiment, and a probe interface 226. The quick-connect interface allows access by the handle 126 to the data bus, control lines, and power bus used by the noncontact distance measurement device 242 and other accessories. In an embodiment, the probe end electronics 230 are located in the measurement probe housing 102 on the AACMM 100. In an embodiment, the handle 126 may be removed from the quick-connect interface and measurement may be performed by the noncontact distance measurement device 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3A is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as a noncontact distance measurement device 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 7:
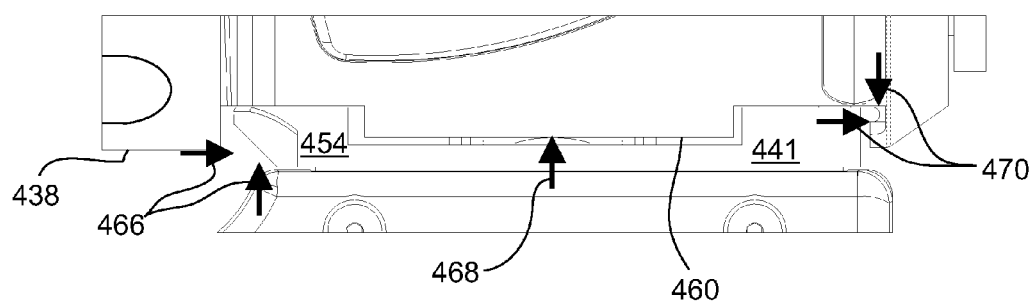
FIG. 7 is an enlarged partial side view of the interface portion of the probe end of FIG. 6.
Figure 8:
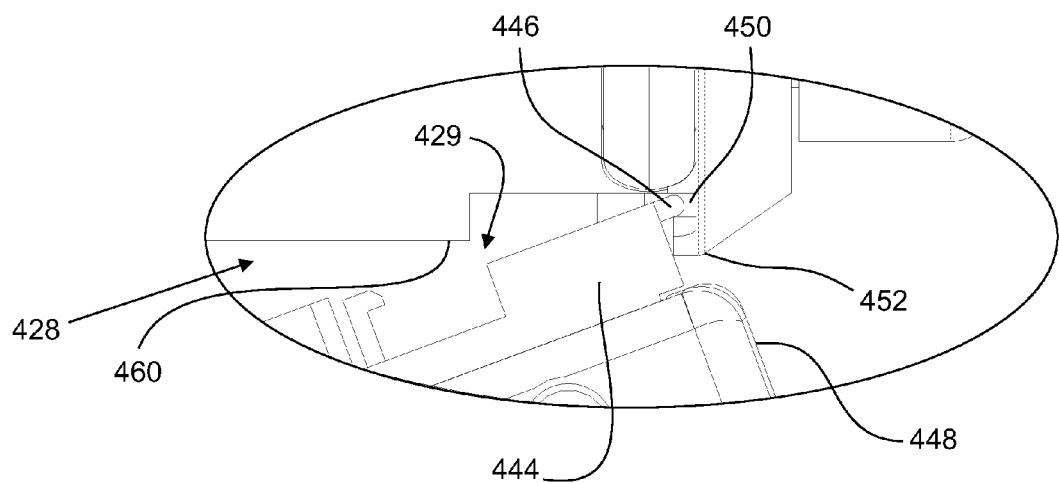
FIG. 8 is another enlarged partial side view of the interface portion of the probe end of FIG. 5.
Figure 9:
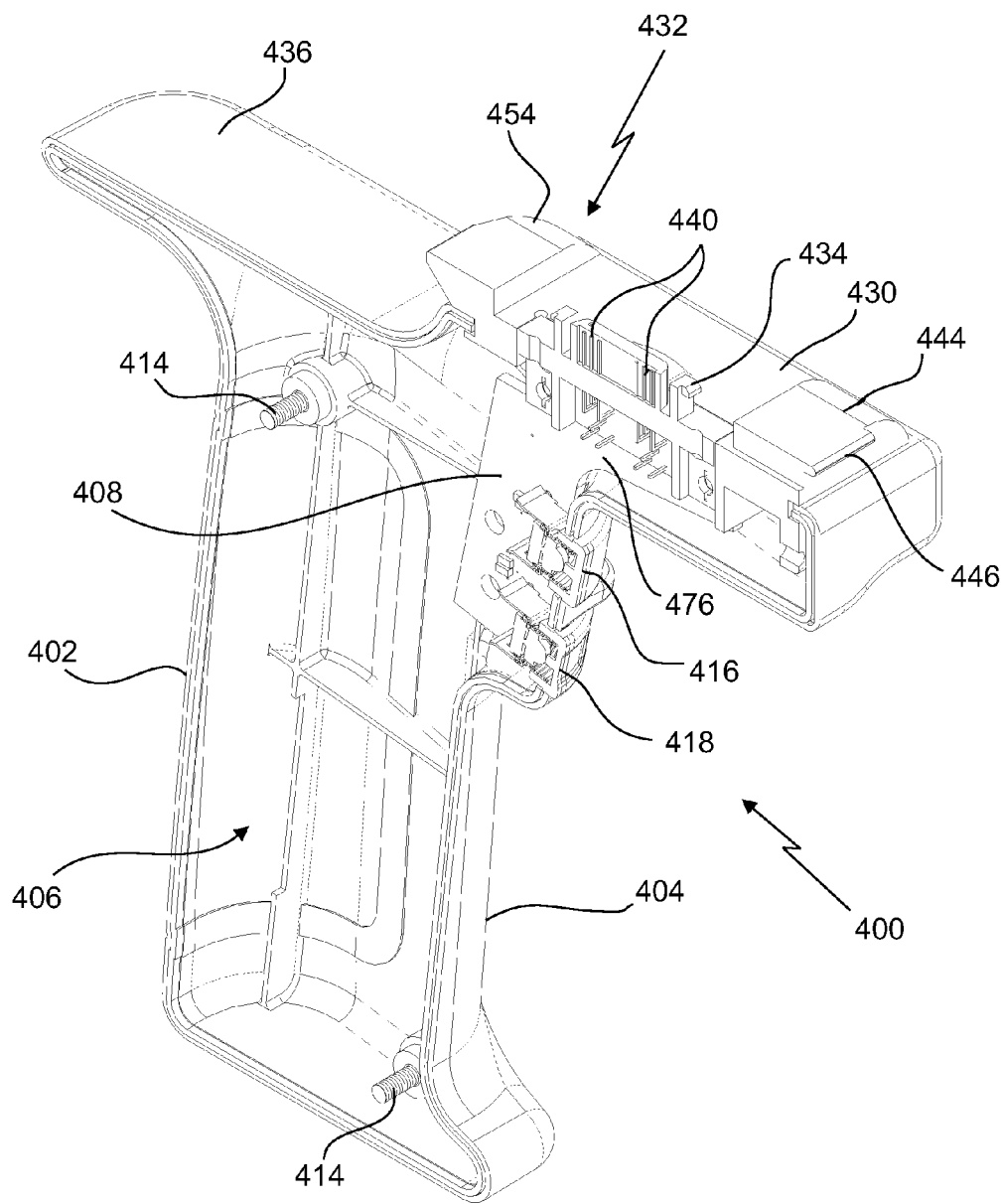
FIG. 9 is an isometric view partially in section of the handle of FIG. 4.
Figure 10:
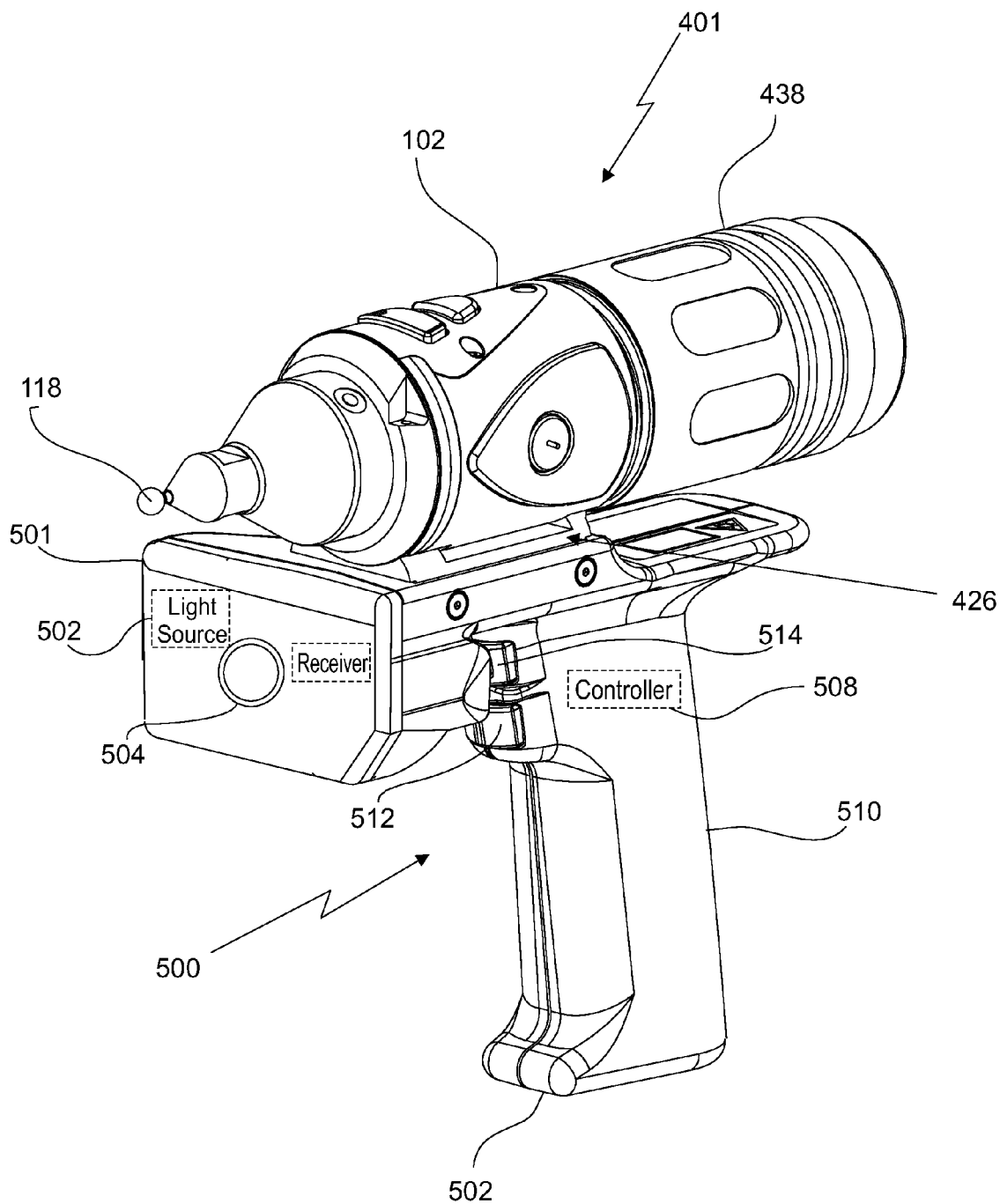
FIG. 10 is an isometric view of the probe end of the AACMM of FIG. 1 with a noncontact distance measurement device attached.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of an axis of rotation for AACMM 100.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
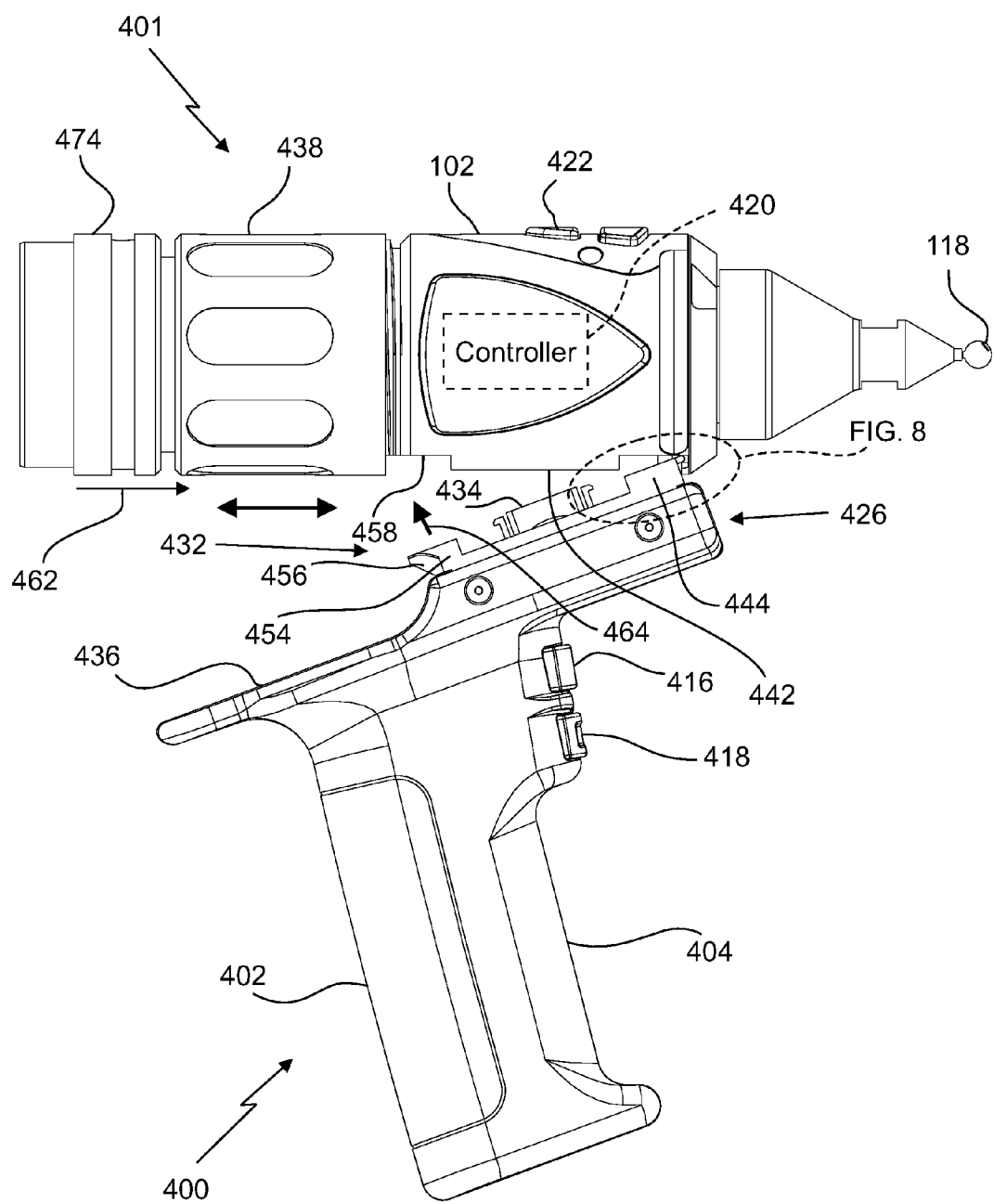
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
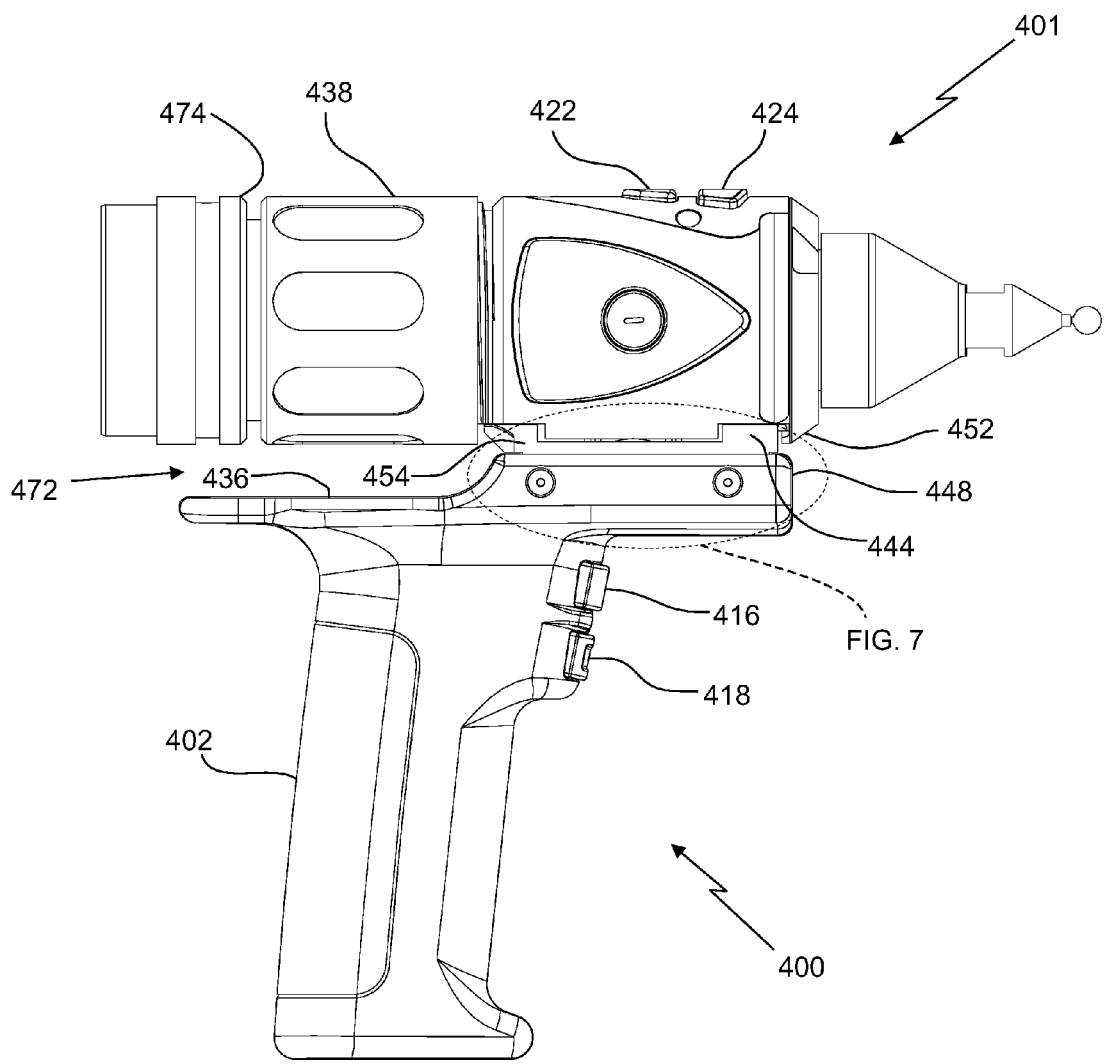
FIG. 6 is a side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protect the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the coded structured light scanner device. This provides advantages in simplifying the requirements of controller 420 and allows for upgraded or increased functionality through the addition of accessory devices.

Referring to FIGS. 10-14, a device 500 is shown that allows for non-contact measurement of an object. In one embodiment, the device 500 is removably coupled to the probe end 401 via the coupler mechanism and interface 426. In another embodiment, the device 500 is integrally connected to the probe end 401. As will be discussed in more detail below, the device 500 may be an interferometer (FIG. 11) an absolute distance measurement (ADM) device (FIG. 12), a focusing meter (FIG. 13 and FIG. 14) or another type of non-contact distance measurement device.

The device 500 further includes an enclosure 501 with a handle portion 510. In one embodiment, the device 500 may further include an interface 426 on one end that mechanically and electrically couples the device 500 to the probe housing 102 as described herein above. The interface 426 provides advantages in allowing the device 500 to be coupled and removed from the AACMM 100 quickly and easily without requiring additional tools. In other embodiments, the device 500 may be integrated into the probe housing 102.

The device 500 includes an electromagnetic radiation transmitter, such as a light source 502 that emits coherent or incoherent light, such as a laser light or white light for example. The light from light source 502 is directed out of the device 500 towards an object to be measured. The device 500 may include an optical assembly 504 and an optical receiver 506. The optical assembly 504 may include one or more lenses, beam splitters, dichromatic mirrors, quarter wave plates, polarizing optics and the like. The optical assembly 504 splits the light emitted by the light source and directs a portion towards an object, such as a retroreflector for example, and a portion towards the optical receiver 506. The optical receiver 506 is configured receive reflected light and the redirected light from the optical assembly 504 and convert the light into electrical signals. The light source 502 and optical receiver 506 are both coupled to a controller 508. The controller 508 may include one or more microprocessors, digital signal processors, memory and signal conditioning circuits.

Further, it should be appreciated that the device 500 is substantially fixed relative to the probe tip 118 so that forces on the handle portion 510 do not influence the alignment of the device 500 relative to the probe tip 118. In one embodiment, the device 500 may have an additional actuator (not shown) that allows the operator to switch between acquiring data from the device 500 and the probe tip 118.

The device 500 may further include actuators 512, 514 which may be manually activated by the operator to initiate operation and data capture by the device 500. In one embodiment, the optical processing to determine the distance to the object is performed by the controller 508 and the distance data is transmitted to the electronic data processing system 210 via bus 240. In another embodiment optical data is transmitted to the electronic data processing system 210 and the distance to the object is determined by the electronic data processing system 210. It should be appreciated that since the device 500 is coupled to the AACMM 100, the electronic processing system 210 may determine the position and orientation of the device 500 (via signals from the encoders) which when combined with the distance measurement allow the determination of the X, Y, Z coordinates of the object relative to the AACMM.

Figure 11:
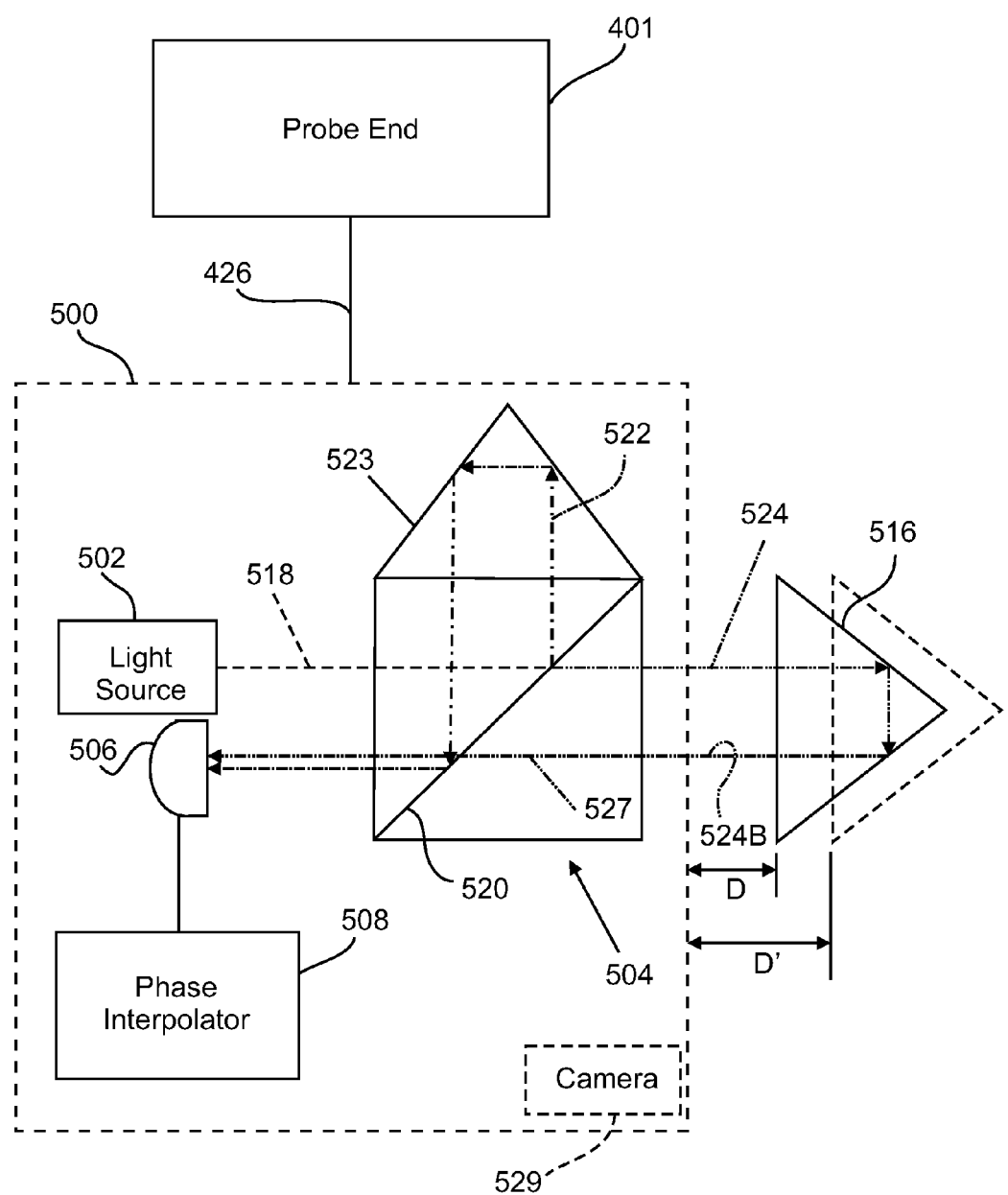
FIG. 11 is a schematic view of an embodiment wherein the device of FIG. 10 is an interferometer system.

In one embodiment, the device 500 shown in FIG. 11 is an interferometer. An interferometer is a type of distance meter that sends a beam of coherent light, such as laser light for example, to a point on an object. In the exemplary embodiment, the object is an external retroreflector 516 for example. The interferometer combines the returned light with a reference beam of light to measure a change in distance of an object. By arranging the retroreflector 516 at an initial position where the distance D is known, as the retroreflector 516 is moved to a new position the distance D' may be determined. With an ordinary or incremental interferometer, the distance is determined by counting half-wavelengths since the interference pattern of the light repeats for every half wavelength of movement of the object point relative to the distance meter. The retroreflector 516 may be a spherically mounted retroreflector that comprises a metal sphere into which a cube corner retroreflector is embedded. The cube corner retroreflector comprises three perpendicular mirrors that come together at a common apex point. In an embodiment, the apex point is placed at the center of the metal sphere. By holding the sphere in contact with an object, the distance to object surface points may be measured by the interferometer. The retroreflector 516 may also be any other type of device that sends the light back parallel to the outgoing light.

In an embodiment, the device 500 is an incremental interferometer. The incremental interferometer has a measured distance D calculated using $D = a + (n+p)*(\text{lambda}/2)*c/n$, where "a" is a constant, "n" is the integer number of counts that have transpired in the movement of a target, "p" is the fractional part of a cycle (a number 0 to 1 corresponding to a phase angle of 0 to 360 degrees), "lambda" is the wavelength of the light in vacuum, "c" is the speed of light in vacuum, and "n" is the index of refraction of the air at wavelength of the light 524 at the temperature, barometric pressure, and humidity of the air through which the light 524 passes. The index of refraction is defined as the speed of light in vacuum divided by the speed of light in a local medium (in this case air), and so it follows that the calculated distance D depends on the speed of light in air "c/n". In an embodiment, light 518 from a light source 502 passes through a interferometer optic 504, travels to a remote retroreflector 516, passes through the interferometer optic 504 in a return path, and enters an optical receiver. The optical receiver is attached to a phase interpolator. Together the optical receiver and phase interpolator include optics and electronics to decode the phase of the returning light and to keep track of the number of half-wavelength counts. Electronics within the phase interpolator or elsewhere within the articulated arm 100 or in an external computer determine the incremental distance moved by the retroreflector 516. The incremental distance travelled by the retroreflector 516 of FIG. 11 is D'−D. A distance D' at any given time may be determined by first finding the position of the retroreflector at a reference position, which might for example be a distance D from a reference point on the articulated arm CMM. For example, if the retroreflector resides within a spherically mounted retroreflector (SMR), a distance D' may be found by first locating the retroreflector 516 at a reference location, which might be for example a magnetic nest configured to hold the SMR. Thereafter, as long as the beam is not broken between the source of light 502 and the retroreflector 516, the total distance D' can be determined by using a reference distance as the value "a" in the equation discussed hereinabove. A reference distance might be determined, for example, by measuring a reference sphere with the scanner held at a variety of orientations. By self-consistently solving for the coordinates of the reference sphere, the reference distance can be determined.

FIG. 11 shows an emitted outgoing beam of light 524 travelling parallel to, but offset from, the returning beam of light 524B. In some cases, it may be preferable to have the light return on itself so that the light 524 and 524B are traveling along the same path but in opposite directions. In this case, it may be important to use an isolation method to keep reflected light from entering and destabilizing the light source 520. One means for isolating the laser from the returning light is to place a Faraday isolator in the optical pathway between the light source 502 and the returning light 524B.

In one embodiment of an incremental interferometer, the interferometer is a homodyne type of the device such that the light source 502 is a laser that operates on a single frequency. In other embodiments, the device may be a heterodyne type of device and the laser operates on at least two frequencies to produce two overlapping beams that are polarized and orthogonal. The light source 502 emits a light 518 that is directed into a beam splitting device 520. Here, a first portion 522 of the light is reflected and transmitted to the optical receiver 506. The first portion 522 is reflected off of at least one mirror 523 to direct the first portion to the optical receiver 506. In the exemplary embodiment, the first portion 522 is reflected off a plurality of mirrors 523 and the beam splitter 520. This first portion 522 is a reference beam of light that used for comparison with a returned or reflected light.

A second portion 524 of the light is transmitted through the beam splitting device 520 and is directed towards the retroreflector 516. It should be appreciated that the optical assembly 504 may further include other optical components, such as but not limited to lenses, quarter wave plates, filters and the like (not shown) for example. The second portion 524 of light travels to the retroreflector 516, which reflects the second portion 524 back towards the device 500 along a path 527 that is parallel to the outgoing light. The reflected light is received back through the optical assembly where it is transmitted through the beam splitting device 520 to the optical receiver 506. In the exemplary embodiment, as the returning light is transmitted through the beam splitting device 520, it joins a common optical path with the light of first portion 522 to the optical receiver 502. It should be appreciated that the optical assembly 504 may further include additional optical components (not shown), such as an optic that produces a rotating plane of polarization for example, between the beam splitting device 520 and the optical receiver 506. In these embodiments, the optical receiver 506 may be composed of multiple polarization sensitive receivers that allow for power normalization functionality.

The optical receiver 506 receives both the first portion 522 and the second portion 524 light. Since the two light portions 522, 524 each have a different optical path length, the second portion 524 will have a phase shift when compared to the first portion 522 at the optical receiver 506. In an embodiment where the device 500 is a homodyne interferometer, the optical receiver 506 generates an electrical signal based on the change in intensity of the two portions of light 522, 524. In an embodiment where the device 500 is a heterodyne interferometer, the receiver 506 may allow for phase or frequency measurement using a technique such as a Doppler shifted signal for example. In some embodiments, the optical receiver 506 may be a fiber optic pickup that transfers the received light to a phase interpolator 508 or spectrum analyzer for example. In still other embodiments, the optical receiver 506 generates an electrical signal and transmits the signal to a phase interpolator 508.

In an incremental interferometer, it is necessary to keep track of the change in the number of counts n (from the equation described hereinabove). For the case of which the beam of light is kept on a retroreflector 516, the optics and electronics within the optical receiver 506 may be used to keep track of counts. In another embodiment, another type of measurement is used, in which the light from the distance meter is sent directly onto the object to be measured. The object, which might be metallic, for example, may reflect light diffusely so that only a relatively small fraction of the light returns to an optical receiver. In this embodiment, the light returns directly on itself so that the returning light is substantially coincident with the outgoing light. As a result, it may be necessary to provide a means to reduce the amount of light feeding back into the light source 502, such as with a Faraday isolator for example.

One of the difficulties in measuring the distance to a diffuse target is that it is not possible to count fringes. In the case of a retroreflector target 516, it is known that the phase of the light changes continuously as the retroreflector is moved away from the tracker. However, if a beam of light is moved over an object, the phase of the returning light may change discontinuously, for example, when the light passes by an edge. In this instance, it may be desired to use a type of interferometer known as an absolute interferometer. An absolute interferometer simultaneously emits multiple wavelengths of light, the wavelengths configured to create a "synthetic wavelength," which might be on the order of a millimeter, for example. An absolute interferometer has the same accuracy as an incremental interferometer except that it is not necessary to count fringes for each half wavelength of movement. Measurements can be made anywhere within a region corresponding to one synthetic wavelength.

In an embodiment, the optical assembly 504 may include a steering mirror (not shown), such as a micro-electromechanical system (MEMS) mirror that allows light from an absolute interferometer to be reflected from the scanner and received back by the scanner to measure rapidly over an area.

In one embodiment the device may include an optional image acquisition device, such as a camera 529, which is used in combination with an absolute interferometer. The camera

529 includes a lens and a photosensitive array. The lens is configured to image the illuminated object point on a photosensitive array. The photosensitive array is configured to be responsive to the wavelengths of light emitted by the absolute interferometer. By noting the position of the imaged light on the photosensitive array, it is possible to determine the ambiguity range of the object point. For example, suppose that an absolute interferometer has an ambiguity range of 1 mm. Then as long as the distance to the target is known to within one millimeter, there is no problem in using the interferometer to find the distance to the target. However, suppose that the distance to the target is not known to within the ambiguity range of one millimeter. In one embodiment, a way to find the distance to the target to within the ambiguity range is to place the camera 529 near the point of emission of the beam of light. The camera forms an image of the scattered light on the photosensitive array. The position of the imaged spot of light depends on the distance to the optical target and thereby provides a way of determining the distance to the target to within the ambiguity range.

In an embodiment, the distance measurement device uses coherent light (e.g. a laser) in the determination of the distance to the object. In one embodiment, the device varies the wavelength of a laser as a function of time, for example, linearly as a function of time. Some of the outgoing laser beam is sent to an optical detector and another part of the outgoing laser beam that travels to the retroreflector is also sent to the detector. The optical beams are mixed optically in the detector and an electrical circuit evaluates the signal from the optical detector to determine the distance from the distance meter to the retroreflector target.

In one embodiment the device 500 is an absolute distance meter (ADM) device. An ADM device typically uses an incoherent light and determines a distance to an object based on the time required to travel from the distance meter to the target and back. Although ADM devices usually have lower accuracy than interferometers, an ADM provides an advantage in directly measuring distance to an object rather than measuring a change in distance to the object. Thus, unlike an interferometer, an ADM does not require a known initial position.

One type of ADM is a pulsed time-of-flight (TOF) ADM. With a pulsed TOF ADM, a laser emits a pulse of light. Part of the light is sent to an object, scatters off the object, and is picked up by an optical detector that converts the optical signal into an electrical signal. Another part of the light is sent directly to the detector (or a separate detector), where it is converted into an electrical signal. The time dt between the leading edge of the two electrical pulse signals is used to determine the distance to from the distance meter to the object point. The distance D is just $D=a+dt*c/(2n)$, where a is a constant, c is the speed of light in vacuum, and n is the index of refraction of light in air.

Another type of ADM is a phase-based ADM. A phased-based ADM is one in which a sinusoidal modulation is directly applied to a laser to modulate the optical power of the emitted laser beam. The modulation is applied as either a sinusoid or a rectangle. The phase associated with the fundamental frequency of the detected waveform is extracted. The fundamental frequency is the main or lowest frequency of the waveform. Typically, the phase associated with the fundamental frequency is obtained by sending the light to an optical detector to obtain an electrical signal, condition the light (which might include sending the light through amplifiers, mixer, and filters), converting the electrical signals into digitized samples using an analog-to-digital converter, and then calculating the phase using a computational method.

The phase-based ADM has a measured distance D equal to $D=a+(n+p)*c/(2*f*n)$, where "a" is a constant, "n" and "p" are integer and fractional parts of the "ambiguity range" of an object point, and "f" is the frequency of modulation, "c" is the speed of light in vacuum, and n is the index of refraction. The quantity $R=c/(2*f*n)$ is the ambiguity range. If, for example, the modulation frequency is f=3 GHz, then from the formula the ambiguity range is approximately 50 mm. The formula for "D" shows that calculated distance depends on the speed of light in air, "c/n". As in the case of the absolute interferometer, one of the parameters that it is desirable to determine is the ambiguity range for the object point under investigation. For an AACMM 100 used to measure the coordinates of a diffuse surface, the beam of light from the device 500 may in the course of a few milliseconds be directed to objects separated by several meters. If the ambiguity range was not determined, such a large change would likely exceed the ambiguity range of the device and hence would leave the ADM without knowledge of the distance to the object point.

In one embodiment the emitted light is modulated at a plurality of frequencies so that the ambiguity range may be determined in real time. For example, in one embodiment four different modulation frequencies may be simultaneously applied to laser light. By known means of sampling and extraction procedures, the absolute distance to the target can be determined by calculating the phase for each of these four frequencies. In other embodiments, fewer than four frequencies are used. Phase-based ADMs may be used at either near or far ranges. Modulation and processing methods are possible with other types of incoherent distance meters. Such distance meters are well known in the art and are not discussed further.

Figure 12:
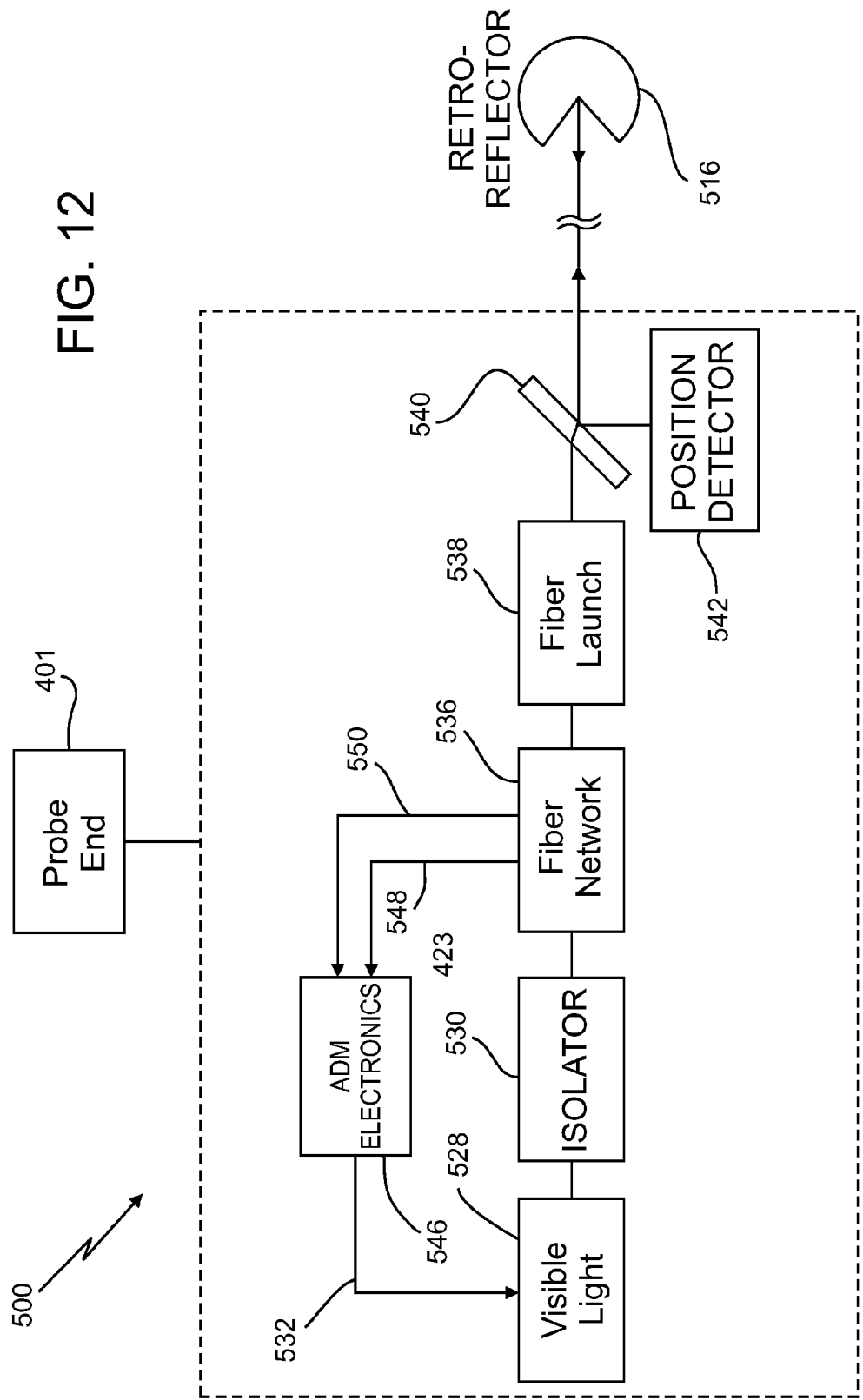
FIG. 12 is a schematic view of an embodiment wherein the device of FIG. 10 is an absolute distance meter system.
Figure 13:
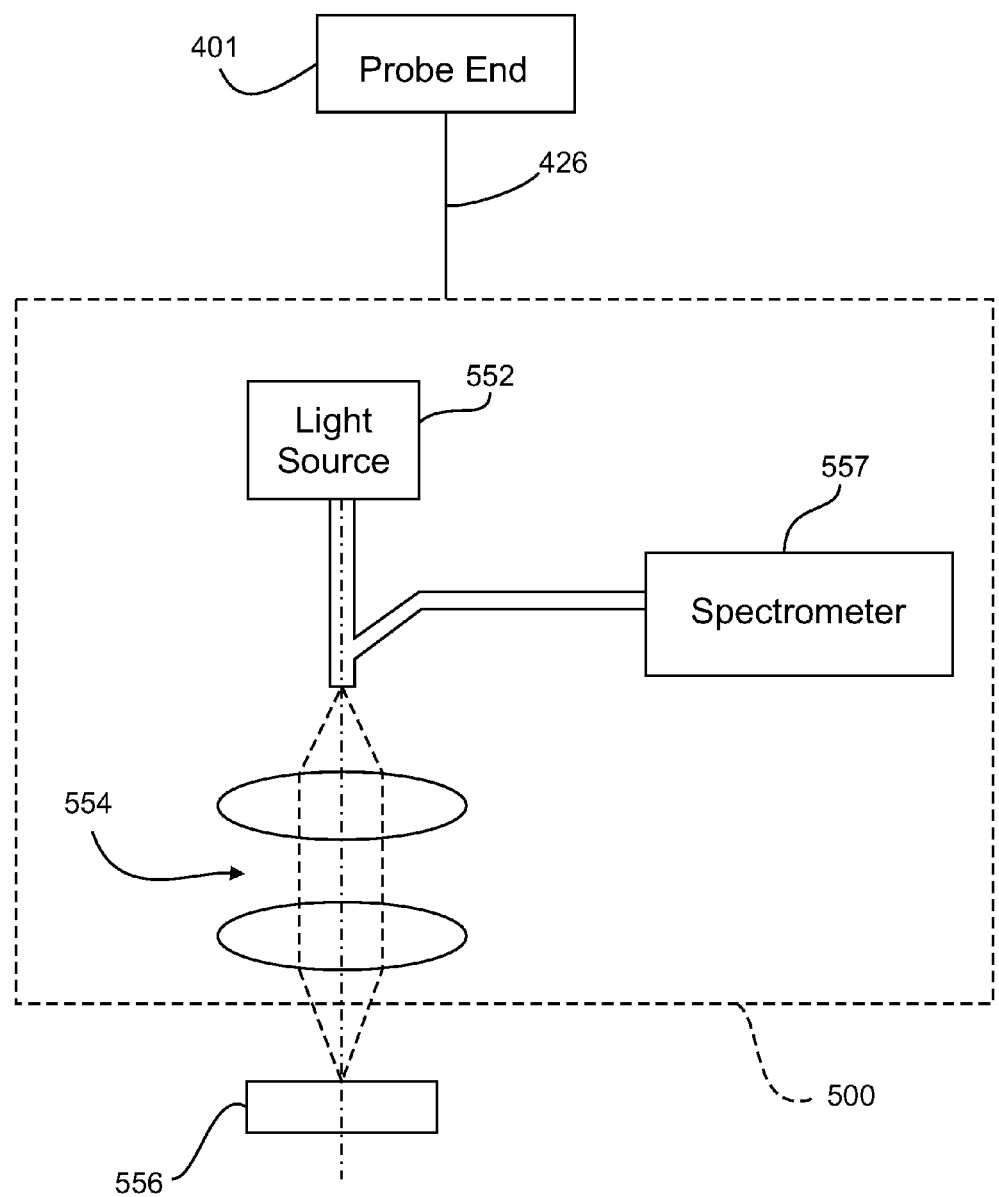
FIG. 13 is a schematic view of an embodiment wherein the device of FIG. 10 is a focusing type distance meter.

In one embodiment shown in FIG. 12, the device 500 is an ADM device that includes a light source 528, an isolator 530, ADM electronics 546, a fiber network 536, a fiber launch 538, and optionally a beam splitter 540 and position detector 542. The light source 528 may be laser such as a red or infrared laser diode for example. Laser light may be sent through an isolator 530, which may be a Faraday isolator or an attenuator, for example. The isolator 530 may be fiber coupled at its input and output ports. ADM electronics 532 modulates the light source 528 by applying a radio frequency (RF) electrical signal to an input of the laser. In an embodiment, the RF signal is applied through the cable 532 which sinusoidally modulates the optical power of the light emitted by the laser at one or more modulation frequencies. The modulated light passing through the isolator travels to the fiber network 536. Some of the light travels over optical fiber 548 to the reference channel of the ADM electronics 546. Another portion of the light travels out of the device 500, reflects off target 516, and returns to the device 500. In one embodiment, the target 516 is a non-cooperative target such as a diffusely reflecting material such as aluminum or steel. In another embodiment, the target 516 is a cooperative target, such as a retroreflector target, for example, that returns most of the light back to the device 500. Light entering the device 500 passes back through the fiber launch 538 and fiber network 536 and enters the measure channel of the ADM electronics 546 through the fiber optic cable 550. The ADM electronics 546 includes optical detectors that convert the reference and measure optical signals received from the optical fiber 548 and 550 into electrical reference and measure signals. These signals are processed with electronics to determine a distance to the target.

In one embodiment, the light from the device 500 is sent to a retroreflector rather than a non-cooperative (diffusely scattering) target. In this case, a position detector 542 may be included to receive a small amount of light reflected off a beamsplitter 540. The signal received by the position detector 542 may be used by a control system to cause the light beam from the device 500 to track a moving retroreflector 516. If a scattering target is used rather than a retroreflective target, the beamsplitter 540 and the position detector 542 may be omitted.

In one embodiment, the ADM device 500 incorporates a configuration such as that described in commonly owned U.S. Pat. No. 7,701,559 which is incorporated herein by reference. It should be appreciated that both the interferometer devices and the ADM devices determine the distance to the object at least in part based on the speed of light in air.

Another type of distance meter is one based on a focusing method. Examples of focusing distance meters are a chromatic focusing meter, a contrast focusing meter, and an array sensing focusing meter. A device using a chromatic focusing method such as the one shown in FIG. 13, incoherent white light is generated by the light source 552. Due to a chromatic aberration of a lens 554 in the optical assembly the light is focused in a "focal line" on the object 556 based on the wavelength of light. As a result, different wavelengths components of the white light are focused at different distances. Using a spectrometer 557, the distance to the object 556 may be determined.

Figure 14:
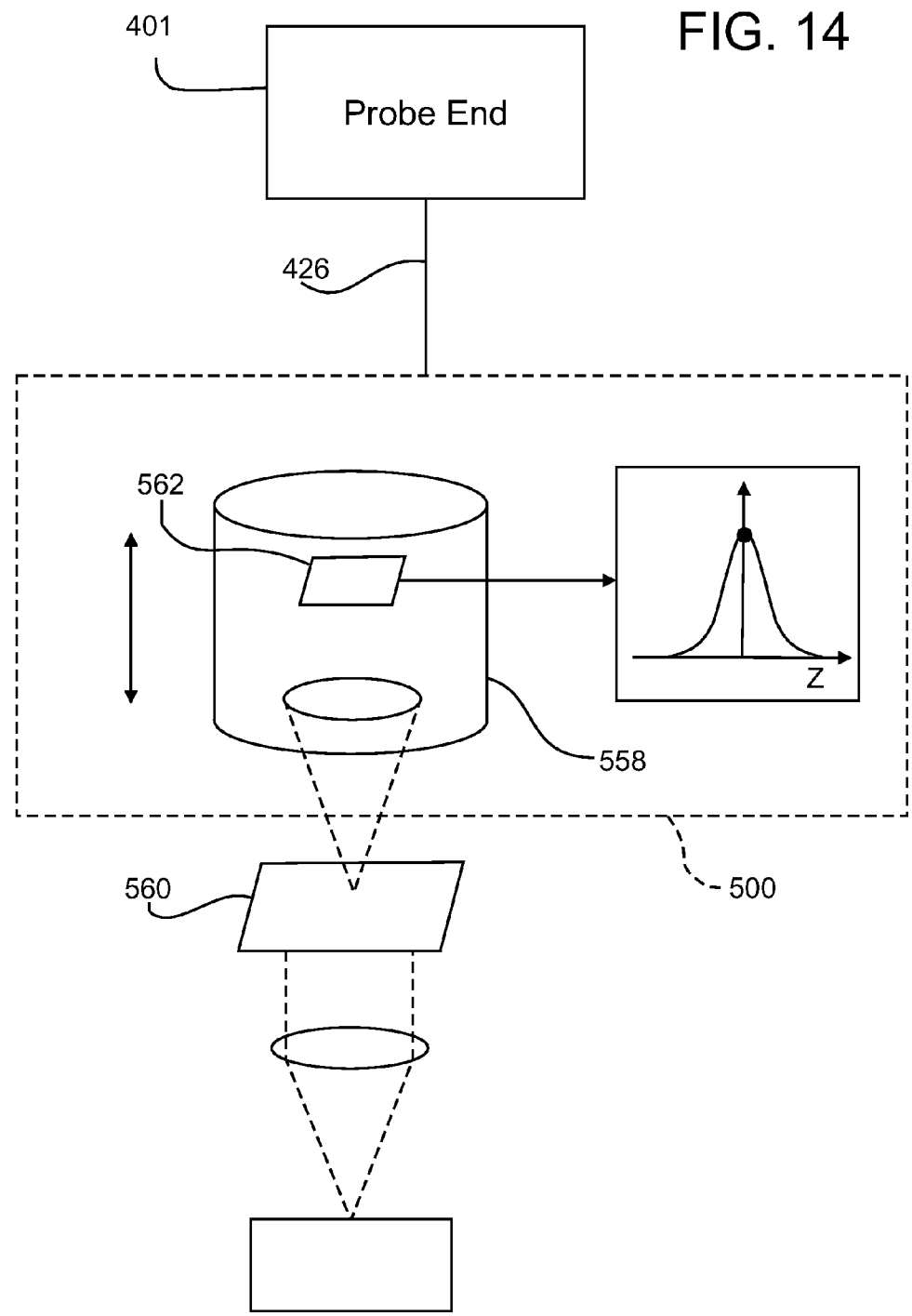
FIG. 14 is a schematic view of an embodiment wherein the device of FIG. 10 is a contrast focusing type of distance meter.

Another type of focusing distance meter shown in FIG. 14 is a contrast focusing device. In this embodiment, the distance to the object is determined by focusing to a maximum contrast or image sharpness. The focusing is achieved by moving a camera 558 along an axis in the direction of the object 560. When the position of greatest contrast has been found, the object 560 lies on the optical axis of the sensor 562 at a known distance. This known distance is predetermined during a calibration process.

In one embodiment, the device 500 may be an array sensing focusing meter. In this type of device, a source of light sends light through a lens and a beam splitter. Part of the light strikes the object, reflects off the beam splitter, and travels to a photosensitive array. If the object under inspection is at the focal position of the spot of light, the light on the photosensitive array will be very small. Hence the AACMM 100 could be used to capture the 3D coordinates whenever the spot on the array was sufficiently small.

In still another embodiment, the device 500 may be a conoscopic holography device. In this type of device, the surface of the object is probed by a laser point. The laser light is diffusely reflected by the surface to form a point light source. The light cone emanating from this point is widened by an optical system. A birefringent crystal is arranged between two circular polarizers to split the light into an ordinary beam and an extraordinary beam. After transmitting through the second polarizing lens, the two beams superimpose to generate a holographic fringe pattern that may be acquired by a photosensitive sensor, such as a CCD camera. The distance to the object is determined from the interference fringes by image processing.

It should be appreciated that while the focusing devices and the conoscopic holography devices may depend on the index of refraction of light in air, the determination of distance for these devices is independent of the speed of light in air.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measuring machine (AACMM) for measuring the coordinates of an object in space, comprising:
   a base;
   a manually positionable arm portion having an opposed first end and second end, the arm portion being rotationally coupled to the base, the arm portion including a plurality of connected arm segments, each arm segment including at least one position transducer for producing a position signal;
   an electronic circuit configured to receive the position signal from the at least one position transducer;
   a probe end coupled to the first end;
   a noncontact measurement device coupled to the probe end, the noncontact measurement device having an electromagnetic radiation transmitter, the noncontact measurement device configured to determine a distance to an object based at least in part on a speed of light in air; and
   a processor electrically coupled to the electronic circuit, the processor configured to determine the three-dimensional coordinates of a point on the object in response to receiving the position signals from the electronic circuit and in response to receiving the distance to the object from the noncontact measurement device.

2. The AACMM of claim 1 wherein the noncontact measurement device is an absolute interferometer device.

3. The AACMM of claim 2 wherein the absolute interferometer includes a camera adjacent the transmitter.

4. The AACMM of claim 1 wherein the noncontact measurement device is a phase-based ADM device.

5. The AACMM of claim 1 wherein the noncontact measurement device is a pulsed time of flight ADM device.

6. The AACMM of claim 1 wherein the noncontact measurement device is removably coupled to the probe end.

7. The AACMM of claim 1 wherein the electromagnetic radiation transmitter is a laser.

8. The AACMM of claim 1 further comprising a contact measurement device coupled to the probe end.

9. The AACMM of claim 1 wherein the noncontact measurement device is removably coupled to the probe end.

10. A method of operating a portable articulated arm coordinate measuring machine for measuring three-dimensional coordinates of an object in space, comprising:
    providing a manually positionable arm portion having an opposed first end and second end, the arm portion including a plurality of connected arm segments, each arm segment including at least one position transducer for producing a position signal;
    receiving at an electronic circuit the position signals from the transducers;
    providing a noncontact measurement device having a controller electrically coupled to the electronic circuit, the noncontact measurement device having an electromagnetic radiation transmitter and a sensor;

transmitting an electromagnetic radiation from the noncontact measurement device onto the object;

receiving a reflected electromagnetic radiation with the sensor;

determining a distance to the object from the reflected electromagnetic radiation received by the sensor, wherein the distance is based at least in part on a speed of light in air and on a time for the electromagnetic radiation to travel from the electromagnetic radiation transmitter to the object and return to the sensor; and determining the three-dimensional coordinates of a point on the object based at least in part on the position signals received from the transducers and on the determined distance.

11. The method of claim 10 wherein, in the step of providing a noncontact measurement device, the noncontact measurement device is an absolute interferometer device.

12. The method of claim 11 wherein, in the step of providing a noncontact measurement device, the absolute interferometer includes a camera adjacent the transmitter.

13. The method of claim 10 wherein, in the step of providing a noncontact measurement device, the noncontact measurement device is a phase-based ADM device.

14. The method of claim 10 wherein, in the step of providing a noncontact measurement device, the noncontact measurement device is a pulsed time of flight ADM device.

15. The method of claim 10 wherein, in the step of providing a noncontact measurement device, the noncontact measurement device is removably coupled to the first end.

16. The method of claim 10 further comprising:
providing a probe end coupled to the first end; and
removably coupling the noncontact measurement device to the probe end.

17. The method of claim 16 wherein:
in the step of providing a probe end, the probe end further includes a fastener and a first electrical connector electrically coupled to the electronic circuit; and,
in the step of providing a noncontact measurement device, the noncontact measurement device further has a coupler and a second electrical connector electrically coupled to the controller.

18. The method of claim 17 further comprising:
mechanically coupling the noncontact measurement device to the probe end with the coupler and the fastener; and
electrically coupling the first electrical connector to the second electrical connector.

19. The method of claim 10 wherein, in the step of providing a noncontact measurement device, the electromagnetic radiation transmitter is a laser.

20. The method of claim 10 further comprising providing a contact measurement device coupled to the first end.

21. A portable articulated arm coordinate measuring machine (AACMM) for measuring three-dimensional coordinates of an object in space, comprising:
a base;
a manually positionable arm portion having an opposed first end and second end, the arm portion being rotationally coupled to the base, the arm portion including a plurality of connected arm segments, each arm segment including at least one position transducer for producing a position signal;
an electronic circuit which receives the position signal from the at least one position transducer;
a probe end disposed between the measurement device and the first end, the probe end having an interface on one side; and
a noncontact measurement device removably coupled to the interface, the noncontact measuring device having a light source and an optical receiver, the noncontact measuring device configured to determine a distance to a point on the object based at least in part on a speed of light in air and on a time for light from the light source to travel from the light source to the object and return to the optical receiver; and
a processor electrically coupled to the electronic circuit, the processor configured to determine the three-dimensional coordinates of the point on the object based at least in part on the position signals received from the transducers and on the determined distance.

22. The AACMM of claim 21 wherein the noncontact measurement device is an absolute interferometer device.

23. The AACMM of claim 22 wherein the absolute interferometer includes a camera adjacent the transmitter.

24. The AACMM of claim 21 wherein the noncontact measurement device is a phase-based ADM device.

25. The AACMM of claim 21 wherein the noncontact measurement device is a pulsed time of flight ADM device.

26. The AACMM of claim 21 further including a contact probe coupled to probe end.

* * * * *